E. C. MORGAN.
MINING MACHINE.
APPLICATION FILED APR. 30, 1913.
1,314,011.
Patented Aug. 26, 1919.
8 SHEETS—SHEET 3.
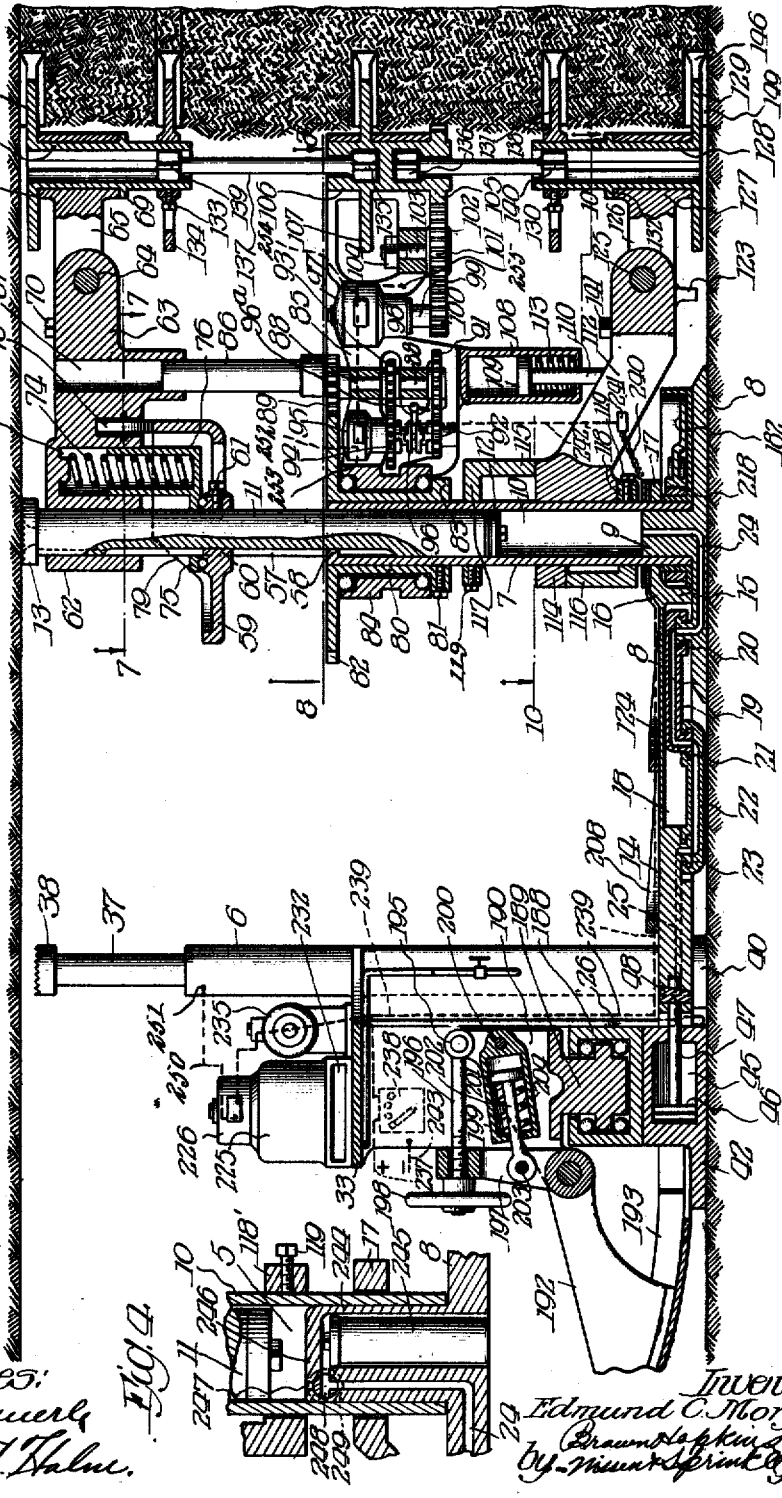

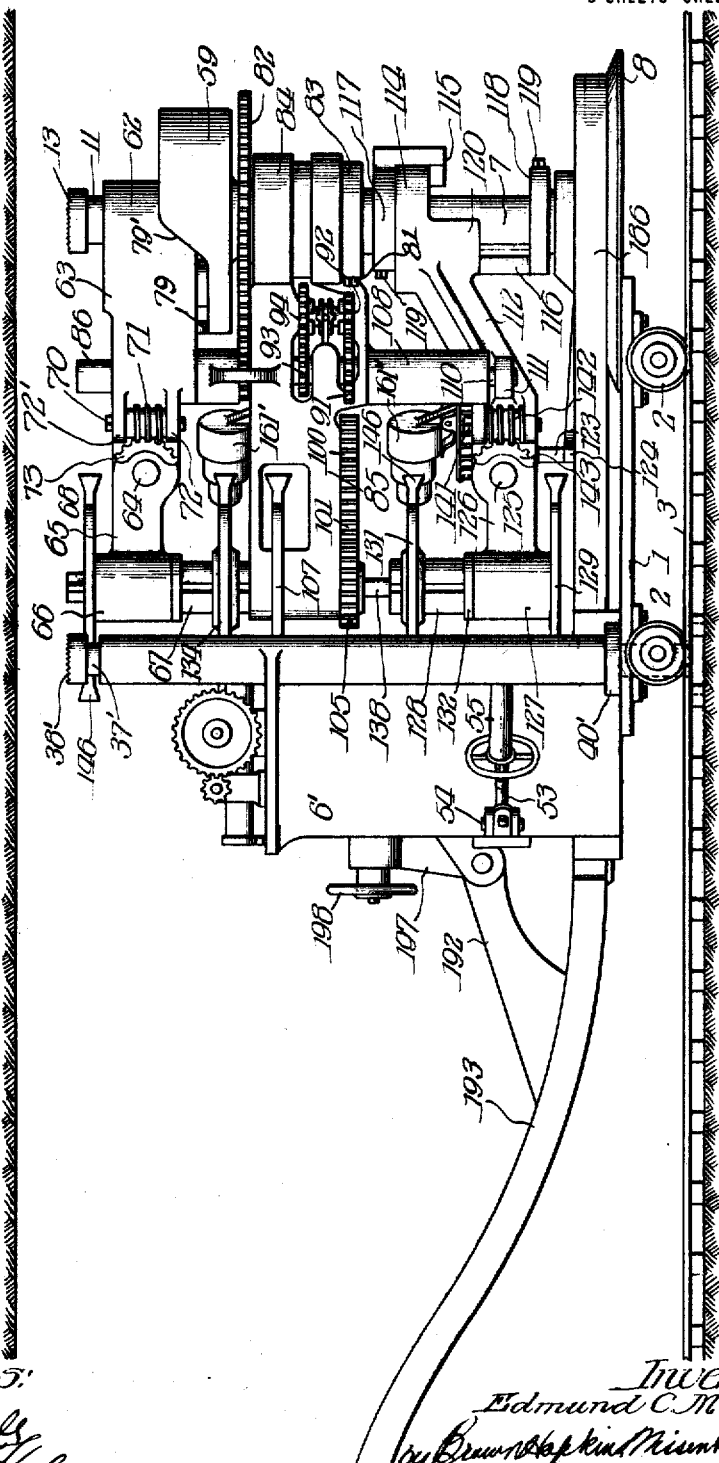

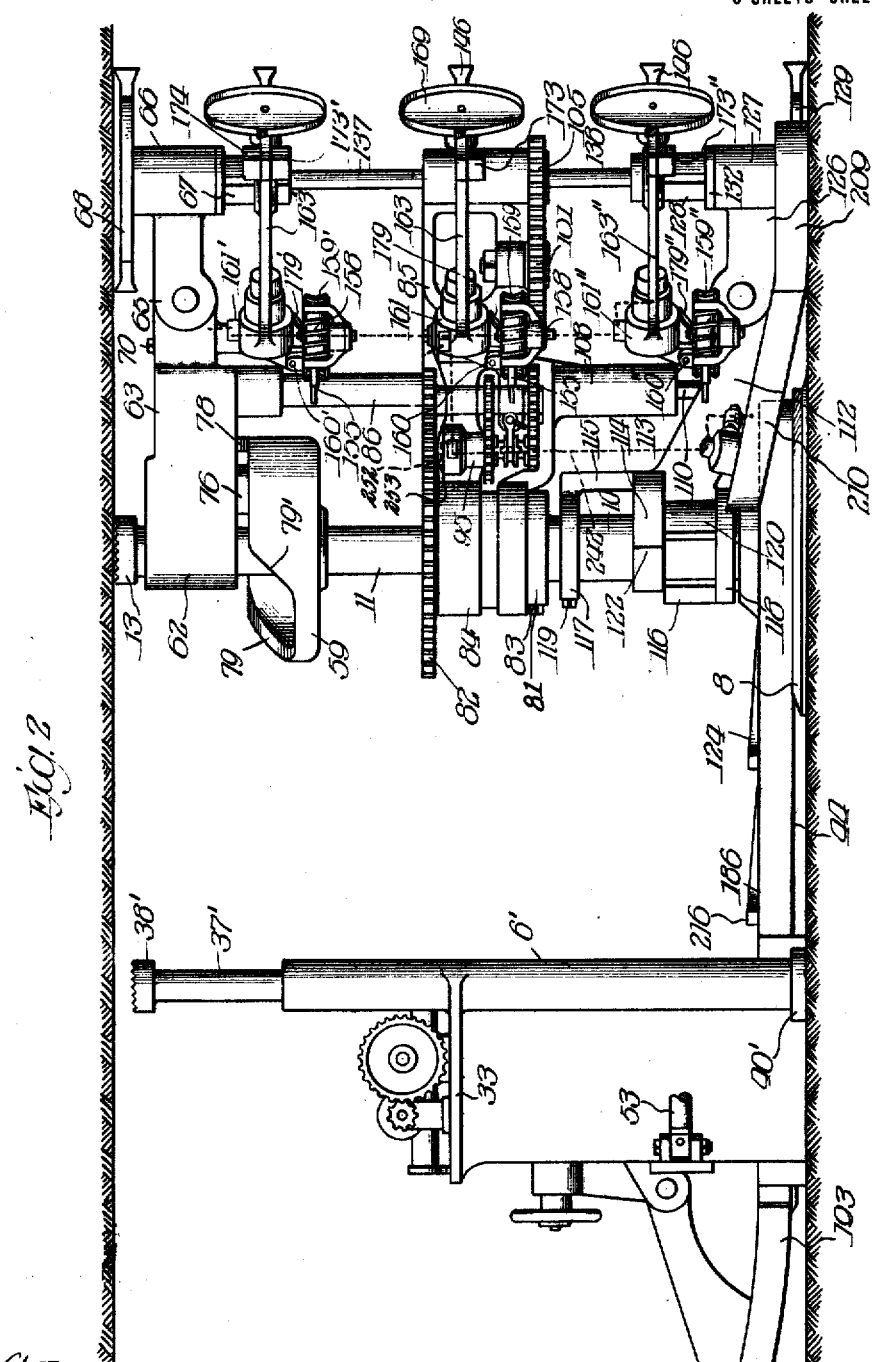

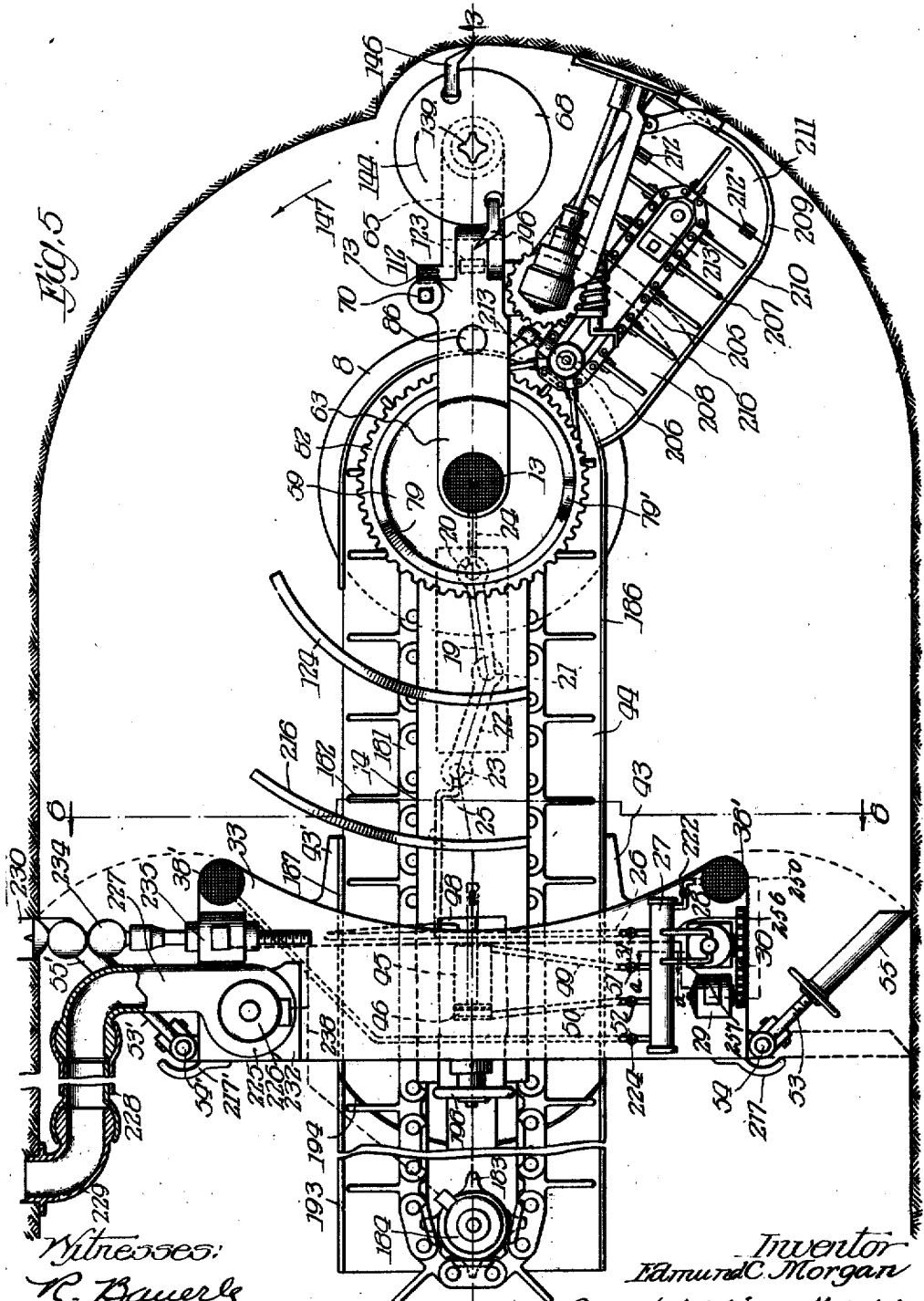

E. C. MORGAN.
MINING MACHINE.
APPLICATION FILED APR. 30, 1913.
1,314,011.
Patented Aug. 26, 1919.
8 SHEETS—SHEET 5.
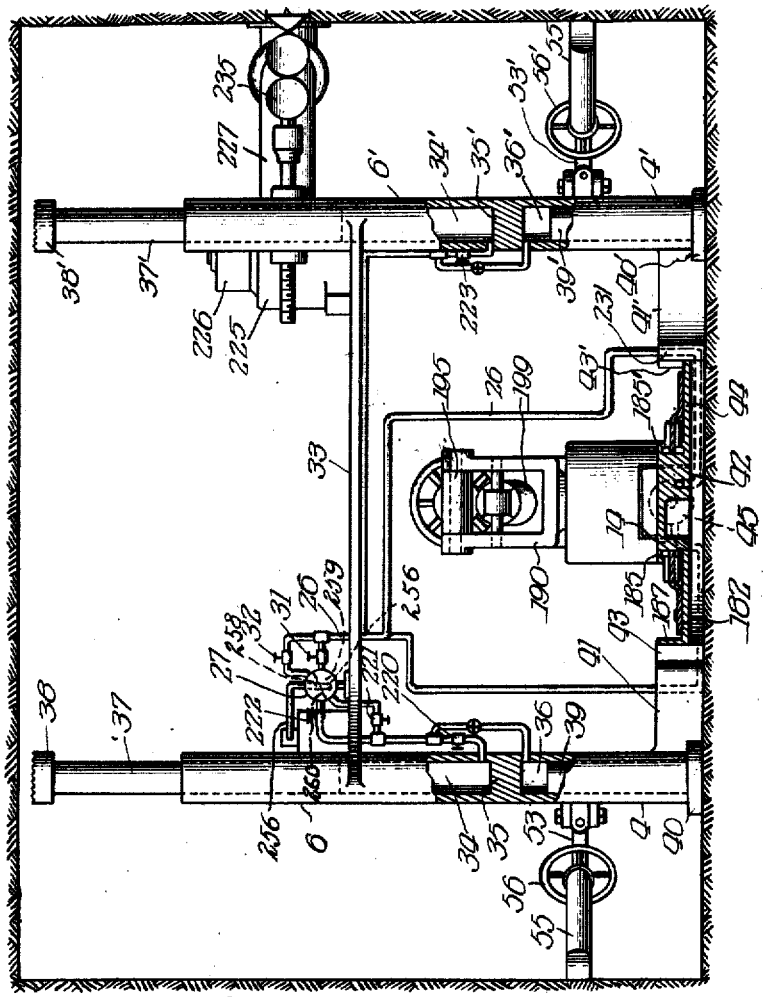
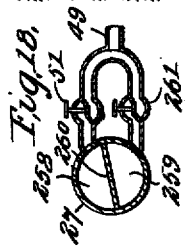

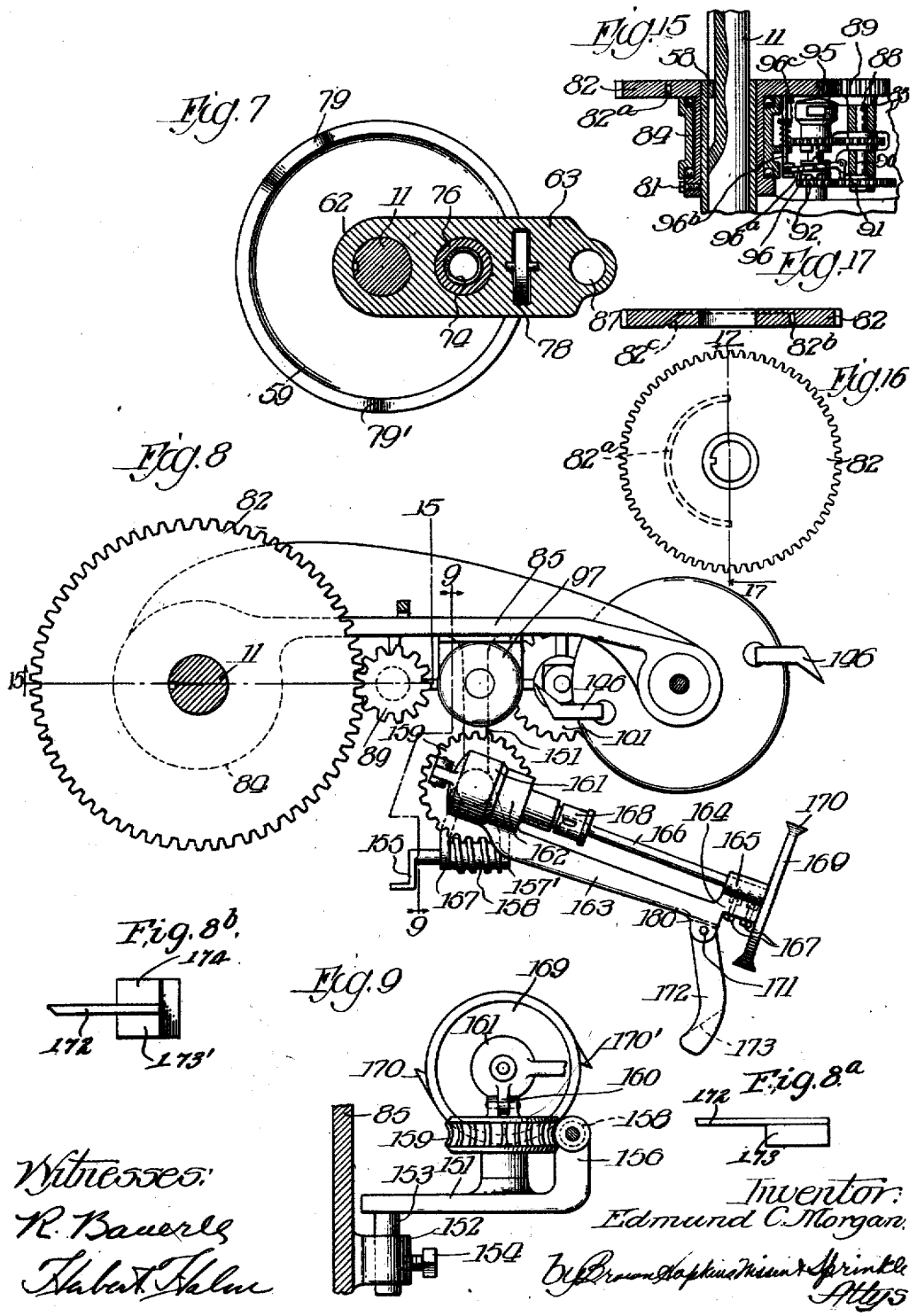

E. C. MORGAN.
MINING MACHINE.
APPLICATION FILED APR. 30, 1913.
1,314,011.
Patented Aug. 26, 1919.
8 SHEETS—SHEET 7.
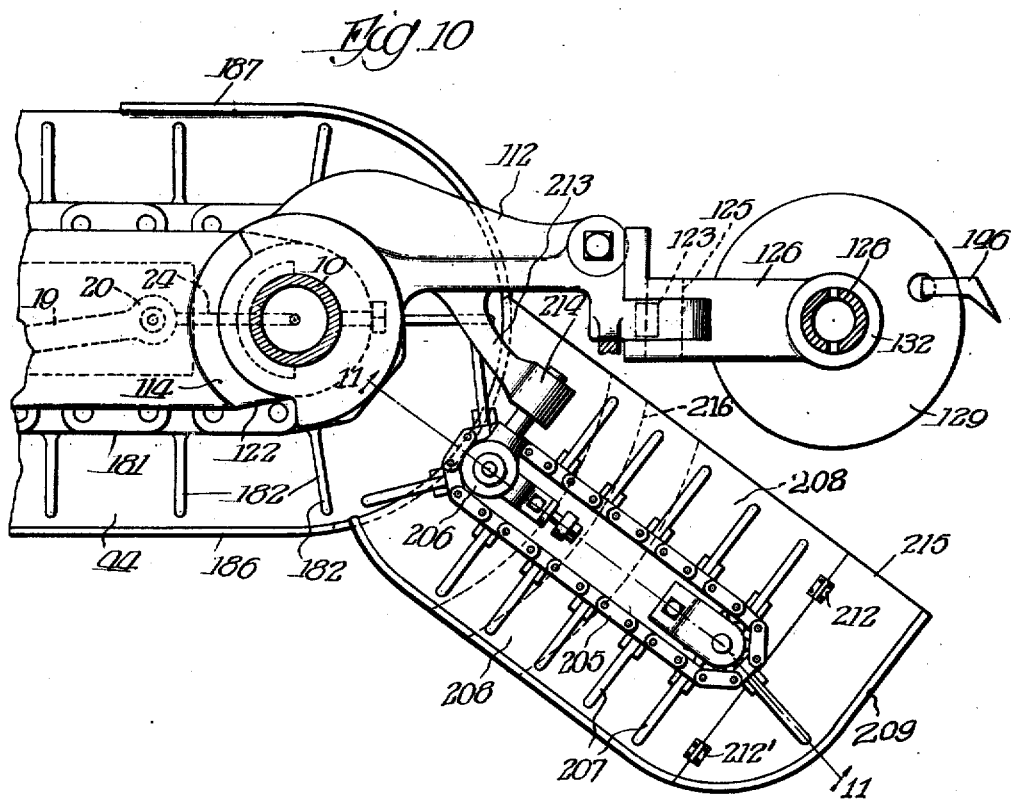
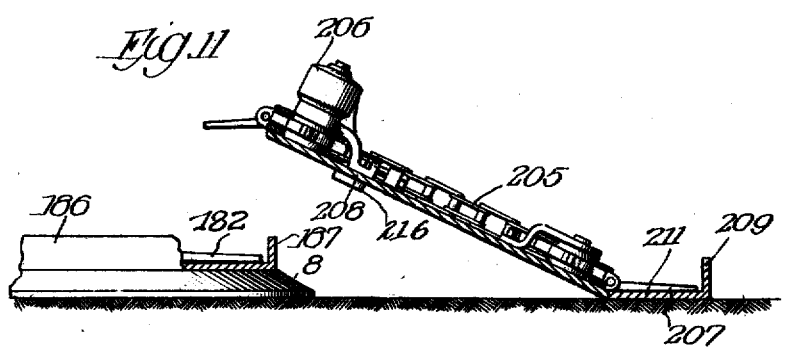

E. C. MORGAN.
MINING MACHINE.
APPLICATION FILED APR. 30, 1913.
1,314,011.
Patented Aug. 26, 1919.
8 SHEETS—SHEET 8.
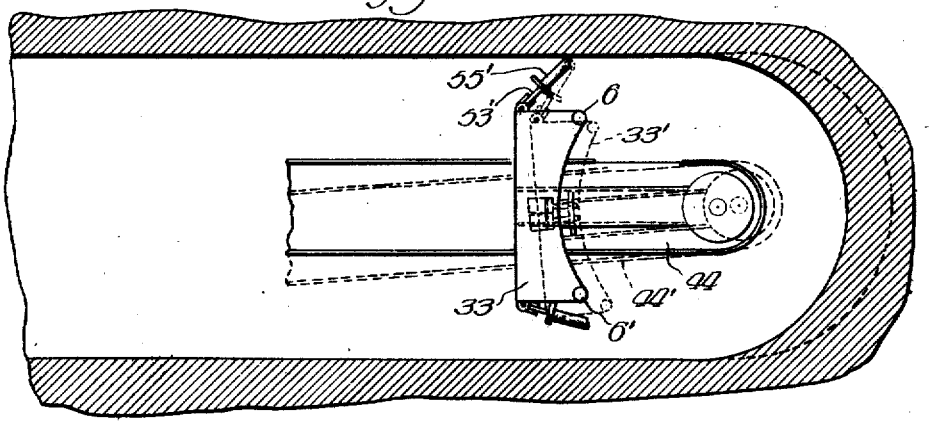
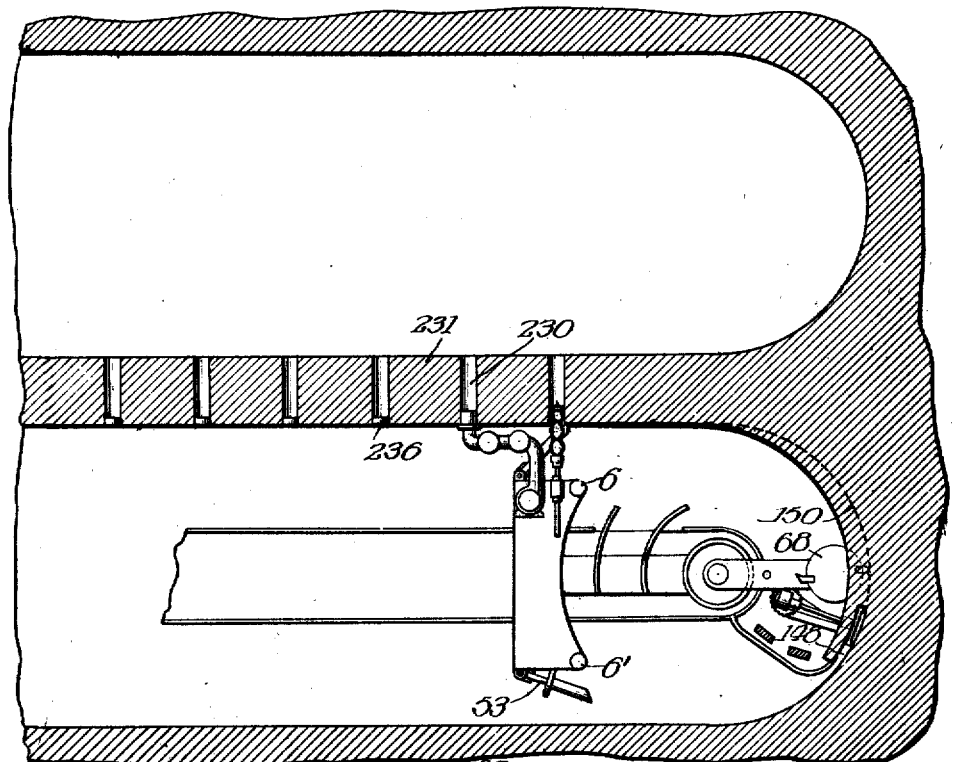
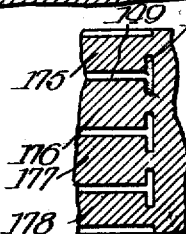
Witnesses:
R. Bauerle
Herbert T. Hahn
Inventor:
Edmund C. Morgan
by Brown Hopkins Medwin & Sprinkle
Attys

UNITED STATES PATENT OFFICE.

EDMUND C. MORGAN, OF CHICAGO, ILLINOIS.

MINING-MACHINE.

1,314,011.   Specification of Letters Patent.   Patented Aug. 26, 1919.

Application filed April 30, 1913. Serial No. 764,487.

*To all whom it may concern:*

Be it known that I, EDMUND C. MORGAN, a citizen of the United States, residing at Chicago, in the county of Cook and State of Illinois, have invented certain new and useful Improvements in Mining-Machines, of which the following is a specification.

My invention relates to mining machines, particularly to those which produce a plurality of kerfs in the mine wall, break down the material and convey it away.

One of the objects of my invention is to improve and simplify such apparatus and increase its efficiency.

Further objects of the invention will appear hereinafter, the novel features and combinations being set forth in the appended claims.

Referring to the accompanying drawings:

Figure 1 is an elevational view of a mining machine embodying my invention, mounted on a truck for transportation; Fig. 2 is an elevational view of the mining machine in position in a mine preparatory to the cutting operation; Fig. 3 is a sectional elevational view on the line 3—3 of Fig. 5, looking in the direction of the arrows; Fig. 4 is a fragmentary vertical sectional view of a modification for lifting the forward portion of the mining machine; Fig. 5 is a plan view of the entire mining machine; Fig. 6 is a vertical sectional view taken on the line 6—6 of Fig. 5, looking in the direction of the arrows; Fig. 7 is a sectional plan view taken on the line 7—7 of Fig. 3; Fig. 8 is a sectional plan view taken on the line 8—8 of Fig. 3; Fig. 8ª is a side elevational view of a portion of the trailer 172 of Fig. 8; Fig. 8ᵇ is a side elevational view of a modification showing a wedge on the upper side of the trailer arm 172 as well as on the lower side; Fig. 9 is a side elevational view taken on the line 9—9 of Fig. 8, looking in the direction of the arrows; Fig. 10 is an enlarged sectional plan view taken on the line 10—10 of Fig. 3; Fig. 11 is an elevational view of a portion of the structure shown in Fig. 10 to show the position of the forward supplemental conveyer when it is in the position indicated by the dash line 11—11; Fig. 12 is a diagrammatic view showing the manner in which the entire mining machine may be shifted to various angles to change its path of travel in the mine; Fig. 13 is a sectional plan view of two rooms of the mine with an intervening wall and the apparatus for removing dust from the mining machine room to the next adjacent room; Fig. 14 illustrates a sectional elevational view through the mine wall after the horizontal and vertical kerfs have been cut by the mining machine; Fig. 15 is a fragmentary, vertical sectional view of a modification, illustrating means for automatically controlling the speed of the cutting mechanism for cutting and non-cutting operations; Fig. 16 is a plan view of the large gear by which the entire mechanism is given a rotary motion; Fig. 17 is a sectional view of said gear on line 17—17 of Fig. 16; Fig. 18, shows on Sheet 1 of the drawings, is a perspective view of the drum 27 and the various pipes connected to the supply and exhaust compartments, the arrows indicating the direction of flow of the fluid in the pipes.

Fig. 1 shows the mining machine folded up compact and mounted on a truck 1, which is provided with wheels 2 running on the track 3. By means of the two rear hydraulic jacks, shown at 4, 4' in Fig. 6, and one hydraulic jack shown at 5 in Fig. 4, the mining machine may be lifted up off the truck 1 and the latter moved out from under the mining machine, after which the machine may be moved to the position in the mine where it is to be used. The hydraulic roof jacks 6, 6' at the rear portion of the machine and the hydraulic roof jack 7 at the forward portion of the machine may then be depended upon to hold the mining machine firmly in its proper position while the cutting operation is being performed.

The mining machine shown in the drawings comprises a circular base plate 8 at the forward portion of the machine, which is provided with a central upwardly extending cylindrical hub 9, over which fits the vertical hollow cylinder 10 of the forward hydraulic jack 7. Extending into the cylinder 10 from its upper end is the plunger 11, the lower end of which may be provided with a leather cup packing to form a piston 12, and the upper end of which may be provided with a shoe 13 serrated on its upper surface. Pivoted to the lower portion of the cylinder 10 is a horizontal plate 14. The forward portion of this plate is provided with a shoe 15, which slides over the upper surface of the circular base plate 8, as shown in Fig. 3. The forward end of the plate 14 may extend upwardly at 16 to the collar 17 which forms the pivotal connection between the plate 14 and the lower portion of the cylinder 10, as shown in Figs. 3 and 5.

On the lower side of the horizontal plate 14 is a rectangular recess 18 for receiving the pipe 19 and the couplings 20 and 21 at its ends. A pipe 22 is also located underneath the plate 14 between the couplings 21 and 23. It will be seen by referring to Figs. 3 and 5 that a passageway 24 is provided through the hub 9 and the base plate 8 to the coupling 20. This establishes communication between the cylinder 10 beneath the piston 12 and the pipe 19. A passageway 25 in the rear portion of the plate 14 connects the coupling 23 to a pipe 26 which extends to a drum 27 of an electrically operated hydraulic pump comprising the pump proper 28, an electric motor 29, and intermediate gearing 30. Between the pipe 26 and the drum 27 are two valves, the one designated 31 being for the supply and the one designated 32 being for the exhaust. Any suitable type of hydraulic pump may be employed in which supply pressure may be obtained by opening the valve 31 and the exhaust controlled by means of the valve 32.

As shown in Figs. 6 and 18, the drum 27 may be divided by a longitudinal partition 260 into a supply compartment 259 and an exhaust compartment 258. By comparing Fig. 5 with Figs. 6 and 18, it will be seen that the pipe 256 is the supply pipe and the pipe 257 the return or exhaust pipe. The valves 31 and 32 being simple valves, are either open or closed, according to the way in which they have been manipulated. If the valve 32 is closed and the valve 31 opened, and the electric motor 29 started to operate the pump, fluid pressure will be exerted through the pipe 26. The pipe 26 communicates through the pipe 25 and the flexible connections, as shown in Fig. 3, with the cylinder 10 wherein the hydraulic pressure acts on the plunger 11 to move its serrated upper end 13 against the roof of the mine and hold the forward frame 8 and all the supports for the cutting mechanism firmly in position. After the cutting operation has been completed, and it is desired to release the forward hydraulic jack, the valve 31 is closed to cut off the supply pressure and the valve 32 is opened so that the water in the cylinder 10 can flow freely into the exhaust compartment 258 of the drum 27.

In the same manner, as shown in Fig. 6, when the valve 221 is closed and the valves 222 and 220 are opened, supply pressure will be exerted in the cylinder 34 to force the plunger 37 upwardly. When it is desired to release the plunger 37, the valve 222 is closed and the valve 221 opened so that the water in the cylinder 34 may flow freely through the valve 221 into the exhaust compartment 258 of the drum 27.

In like manner, pressure may be exerted on the piston 46 in the cylinder 54 either on one side thereof or on the other side, according to the direction in which it is desired to move the forward frame relatively to the rear frame. Figs. 3 and 5 show the relative positions of the frames after the rear frame has been moved forward while the forward frame was being held stationary. In order to accomplish this, it will be seen by reference to Fig. 18, that the opening of the valve 51 and the closing of the valve 261, enables the supply pressure to be exerted in the cylinder 45 ahead of the piston 46, the valve 52 being closed and the valve 262 being opened during this operation. If the rear frame is held stationary by the hydraulic jacks and the forward frame given freedom of movement, pressure may be exerted through the pipe 50 by opening the valve 52 and closing the exhaust valve 262 immediately below the same. At the same time the valve 51 is closed and the valve 261 opened so that the water in the cylinder 45 ahead of the piston 46 may be exhausted into the lower compartment 258 of the drum 27.

When it is desired to firmly anchor the forward portion of the mining in adjusted position, the valve 32 shown in Fig. 6 will be closed and the valve 31 opened. Now when the electric hydraulic pump is operated hydraulic pressure will be exerted in the pipe 26 and such pressure transmitted through the pipes 22 and 19 and through the passage 24 into the cylinder 10 beneath the piston 12. Continued operation of the hydraulic pump will lift the plunger 11 against the roof of the room in the mine and firmly anchor the shoe 13 in the desired position when the valve 31 may be closed. The jack 7 will be held in such position until the valve 32 is opened, whereupon the weight of the plunger 11 will cause the water to recede from the cylinder 10 and allow the plunger to descend to a lower position.

At the rear portion of the mining machine is located a horizontal connecting plate 33 in an intermediate position, as shown in Fig. 6, between the rear hydraulic jacks 6 and 6'. The horizontal plate 33 supports the hydraulic pumping mechanism and it is rigidly connected at its lateral ends to the cylinders 34, 34' of the hydraulic jacks 6, 6', respectively. Beneath the cylinders 34, 34' are partitions 35, 35' to provide independent cylinders 36, 36' for the hydraulic lifting jacks 4, 4'. The roof jacks 6, 6' are provided with plungers 37, 37', which have shoes 38, 38', the latter being preferably serrated on their upper horizontal surfaces. The lifting jacks 4, 4' comprise plungers 39, 39', which have shoes 40, 40' at their lower ends.

As shown in Fig. 6, which is a sectional elevational view of Fig. 5 taken on the line 6—6 looking in the direction of the arrows, the lower ends of the cylinders 36, 36', are connected by the inwardly extending brackets 41, 41' and the intermediate connecting plate 42. The laterally extending brackets 41 and 41' may have forwardly extending portions 43, 43', as shown in Fig. 5, which serve as guides for the longitudinal movement of the trough frame 44. At the central portion of the connecting plate 42 is a hydraulic cylinder 45, in which is located a piston 46 at the inner end of the piston rod 47, the latter extending forwardly and being attached to the cross head 48 at the rear end of the plate 14. Pipes 49 and 50 extend between the ends of the cylinder 45 and the hydraulic pumping apparatus. By means of a set of valves 51 (Fig. 5) similar to those designated 31 and 32 in Fig. 6, water may be forced into the cylinder 45 ahead of the piston 46, or the water may be permitted to be exhausted therefrom. In a similar way a set of valves 52 may be operated to produce or relieve pressure back of the piston 46.

In Figs. 5 and 6 I have shown manually operable jacks comprising screw-threaded rods 53, 53', which are pivoted at 54, 54' to the frame which is attached to the vertical lifting jack cylinders 36 and 36', respectively. On the screw-threaded rods 53, 53' are the shoes 55, 55', which may be adjusted to various angles against the side walls and moved outwardly by means of the wheels 56 and 56'. The brackets 217, 217' may be provided to limit the rearward adjustment of the manual jacks.

I will now describe the kerf cutting mechanism, which is supported by brackets secured to the cylinder and plunger of the forward hydraulic roof jack. The plunger 11 is provided with a vertical slot 57, into which fits the feather or spline 58 at the upper end of the cylinder 10, so that the plunger may have vertical up and down motion, but is prevented from being rotated. On the plunger 11 is located a disk bracket 59, which is prevented from turning on the plunger 11 by the feather 60, and which may be fixed in adjusted position by means of the set screw 61. That is to say, the disk bracket 59 cannot turn relatively to the plunger 11, but may be adjusted to various vertical positions on the plunger 11 and held in adjusted position by means of the set screw 61.

At the upper end of the plunger 11 and surrounding the same is a collar bearing 62, to which is connected the upper horizontal bracket 63, to the forward end of which at 64 is pivoted the cutter carrying arm 65. The outer end of the arm 65 is provided with a collar bearing 66, in which fits the tubular shaft 67. At the upper end of the tubular shaft 67 is located the horizontal disk cutter 68 and beneath the cylindrical collar bearing 66 is a ring collar bearing 69 on the outer surface of the tubular shaft 67. By means of the nut 70 the worm 71 mounted between the bearings 72, 72', as shown in Fig. 1, may be turned in either direction so as to oscillate the segmental worm gear 73 and thereby tilt the arm 65 and disk cutter 68 to various angles.

It will be seen by referring to Fig. 3 that the bracket 63 is yieldingly counterbalanced by means of the spring 74 on the disk bracket 59 which is fixed to the plunger 11. Surrounding the plunger 11 is a ring 75 on ball bearings which rest on the hub portion of the disk 59. The ring 75 is provided with a cylindrical cup 76, which telescopes into the cylindrical recess 77 on the under side of the bracket 63 near the cylindrical collar bearing 62. It will therefore be seen that the bracket or arm 63 and the parts carried thereby are in part supported through the spring 74 and the ring 75 on the ball bearings on top of the hub portion of disk 59. The main support for the bracket 63 is by means of the wheel 78, which is pivoted in suitable position in the bracket 63 intermediate its ends, as shown for example in Fig. 3. The wheel 78 rides on the upper surface or cam of the disk bracket 59, which surface or cam is cylindrical in plan view as shown in Fig. 7, but which is provided with inclined cam surfaces at 79, 79', so as to vary the elevation of the bracket 63 and cutter 68 at certain periods. This can easily be accomplished because the cylindrical collar 62 is free to slide up and down on the plunger 11, the spring 74 acting as a cushion in the descent and because of its counterbalancing action facilitating the ascent.

At the upper end of the cylinder 10 is mounted a cylindrical collar 80, which may be secured in adjusted position by means of the set-screw 81. To the upper end of the cylindrical collar 80 is secured the circular or disk gear 82. At the lower end of the cylindrical collar 80 is a ring bearing 83 to form a ball race. Between the ring bearing 83 and the under surface of the disk gear 82 and surrounding the cylindrical collar 80 is the freely movable cylindrical collar 84. It will be seen that this collar 84 is connected by ball bearings to the collar 80 and is supported on the ring bearing 83. Securely attached to the freely movable cylindrical collar 84 is a bracket arm 85, which supports a plurality of parts. The bracket arm 85 is in reality an intermediate frame for the cutter mechanism.

Rigidly connected to the frame 85 and extending upwardly therefrom is the vertical rod 86, which has a sliding connection with the arm 63 by fitting into the cylindrical opening 87 which extends vertically through the arm 63, as shown in Fig. 3. By this means whenever the frame 85 is moved horizontally or rotated the arm 63 will be likewise rotated because of the connection through the rod 86.

Journaled in the upper portion of the frame or arm 85 is a short vertical shaft 88, at the upper end of which is a pinion 89 which meshes with the disk gear 82. In the lower portion of the frame 85 is journaled an extension of the shaft 88, at the lower end of which is a gear wheel 91, which meshes with a pinion 92, which is also mounted in the frame 85, as shown in Fig. 3. Intermediately mounted on the shaft 88 is a gear 93, which meshes with the gear 94. An electric motor 95 provided with suitable starting mechanism is mounted in the frame 85 near the cylindrical collar 84. I prefer to mount this motor 95 so that its shaft will occupy a vertical position. Gears 92 and 94 are loosely mounted on the shaft of the electric motor 95, but the clutch member 96 is splined thereto and may be manually operated by the handle 96$^a$, or automatically operated by any suitable means, such, for instance, as illustrated in Figs. 15, 16 and 17, so as to connect the motor shaft to either the gear 94 or the gear 92. It should be understood that the pinion 89, the gears 93 and 91 and the shaft 88 are mounted to rotate together. It will also be observed that the gear 92 is small as compared with the gear 91 and that the gear 94 is large as compared with the gear 93. Therefore when the gear 92 is thrown in, the pinion 89 will be rotated slowly for the feeding motion of the cutting mechanism. When the gear 94 is thrown in, however, the pinion 89 will be rotated comparatively fast, which should be done when the cutting mechanism is to be moved to a new cutting position after having completed a series of cuts. In the event that this mechanism is to be controlled manually, the clutch 96 may be operated each time the speed of rotation is to be changed, by means of the handle 96$^a$, this being done by the operator. As above intimated, however, I have illustrated in Figs. 15, 16 and 17 a modified construction by which the change in speed may be automatically controlled during the rotary movement of the mechanism. Referring to these figures it will be seen that a rod 96$^b$ may be mounted in suitable brackets formed on the collar 84 to reciprocate vertically. This rod is constantly urged in a vertical direction in its bearings by means of a spring 96$^c$ positioned between a collar on the rod and the lower bearing of the rod. The lower end of the rod may form a forked end for engagement with the handle 96$^a$ so that when the rod is reciprocated vertically it will shift handle 96$^a$ to throw the clutch members as previously described. The reciprocation of the rod 96$^b$ may be accomplished automatically at the proper time by means of a concentric groove 82$^a$ formed in the underside of the gear 82, as illustrated in Figs. 15, 16 and 17. This groove or slot 82$^a$ extends through an arc of substantially 180 degrees. During the time that the cutting mechanism is in its cutting position, that is, during the rotation thereof through the arc in which the cutting of the material actually takes place, the rod 96$^b$ is held in its lowermost position because its upper end is in contact with the undersurface of the gear 82. This position of the arm 96$^b$ holds the clutch member in such position as to hold the slow speed gears 91 and 92 in driving relation with the mechanism, as above explained. The moment, however, that the cutting mechanism leaves its cutting position the end 82$^b$ of the slot 82$^a$ arrives in position to allow the rod 96$^b$ to be moved upwardly into said slot by its spring and thereby shift the clutch to the high speed set of gears 93 and 94. The cutting mechanism will then travel at a high speed, as above explained, until it again arrives in cutting position, whereupon the rod 96$^b$ will be forced downwardly out of the slot 82$^a$ and thereby shift the clutch back to the slow speed gears. In order that the rod 96$^b$ may be properly forced downward out of the groove 82$^a$ the end 82$^c$ of said groove is inclined or formed as a cam (see Fig. 17). The end 82$^b$ of the slot or groove 82$^a$, however, may be abrupt since the spring 96$^c$ will act to shift the rod at the proper time. By this modified arrangement it is unnecessary for the operator to watch the speed changing mechanism since the change in speed will automatically occur at the proper times. An additional electric motor 97 is also mounted in the frame 85 and preferably vertically as shown in Fig. 3. If desired, the electric motor may be provided with speed-changing gears in the casing 98. This electric motor may also be provided with suitable starting and regulating apparatus independently of the electric motor 95, although both motors may be connected to a common source of supply comprising removable socket switch connections.

At the lower end of the shaft 99 of the electric motor 97 is a pinion 100, which meshes with the gear 101, the latter being mounted to rotate in the bearing 102 which is supported by means of the bolt 103 and nut 104 at the outer portion of the frame 85, as shown in Fig. 3. The gear 101 meshes with the gear 105, which is located at the lower end of the hub 106 of the disk cutter 107.

Suspended from the frame 85 is an inclosed cylinder 108, in which is located the piston 109, the piston rod 110 of which is connected at 111 to the lowermost cutter frame arm 112, as shown in Figs. 1 and 3. Between the piston 109 and the lower end of the cylinder 108 is a spring 113, which acts on the piston 109 and constantly tends to lift the arm 112.

The hub portion 114 of the rotatable arm 112 is held between the stops 115 and 116 when the arm 112 is in the position shown in Fig. 3. The stops 115 and 116 are arranged vertically and connected to collars 117 and 118 respectively, which surround the cylinder 10. The stop 115 may be adjusted to various vertical positions and may also be rotated to various positions. After the stop 115 is in the desired position it may be held there by means of set-screw. The stop 116 is similarly adjustable and may be held in adjusted position by means of the set-screw 119. The upper surface of the hub 114 may engage the lower end of the stop 115 as shown in Fig. 3, and when freed from this stop during rotation such upper surface may engage the lower surface of the collar, as shown in Fig. 1. The hub 114 is cut away at the side opposite the arm 112, so as to form the interlocking member 120, which is shown in Fig. 1. So long as the interlocking member 120 rests on the stop 116, as shown in Fig. 1, the arm 112 is free to be rotated in either direction, but as soon as the arm 112 is rotated to such position that the member 120 is freed from the stop 116 the hub 114 together with the arm 112 is free to descend. It cannot then be moved backwardly and can then be moved forwardly to the point where the member 120 engages the stop 116. The stop 116 therefore assures the proper lifting of the arm 112 and the hub 114, for if it is attempted to rotate the arm 112 beyond the point where it should be lifted such motion will be arrested by the stop 116. It should also be observed that the hub 114 is cut away at its upper portion as indicated at 122 in Fig. 2, so as to be of less diameter over that portion opposite the arm 112. This will permit the hub 114 to move within the stop 115 when in the position shown in Fig. 1. When in the position shown in Fig. 2 the hub 114 is kept from being lifted because the stop 115 holds the same in its lowermost position.

On the lower side of the outer end of the arm 112 is a depending lug 123 which will engage the cam surface 124 when the arm 112 is rotated a sufficient distance. The cam 124 is arc-shaped in plan view, as shown in Fig. 5, and is securely attached to the upper surface of the rectangular plate 14. The part of the cam which extends from the plate 14 is inclined downwardly so as to receive the depending lug 123 of the arm 112 and gradually lift the latter. When the lug 123 engages the cam 124 the hub 114 is in such position that it has run out from under the stop 115 and is free to be lifted. By the time that the end of the cam is reached the cam has lifted the hub 114 to a position where the interlocking member 120 is near the stop 116 and about to ride on top of the same. It will be seen that the lug 123 is of sufficient length to assure the engagement of the interlocking member 120 with the upper surface of the stop 116 before the lug 123 leaves the cam 124. After the lug 123 leaves the cam 124 the stop 116 will hold the hub 114 and the arm 112 in its uppermost position until the arm 112 and the disk cutter thereon are entirely clear of the conveying apparatus hereinafter described. The stop 116 may be varied in width as desired, but preferably it should be such as to permit the arm 112 to descend again when the outer end of the same approaches the mine wall and a new cut is about to be made.

When the hub 114 is freed from the stop 115 and the cam 124 lifts the arm 112, the spring 113 acting as a counterbalance facilitates this upward motion of the arm 112. The spring 113 also cushions the fall of the arm 112 when the weight of the latter causes the same to descend when the hub 114 is freed from the stop 116.

At the outer end of the arm 112 is pivoted at 125 the disk carrying arm 126, which is provided with a cylindrical bearing 127, in which is journaled the tubular shaft 128 as shown in Fig. 3. The lower end of the tubular shaft 128 is provided with a disk cutter 129 mounted in a horizontal position. At the upper end of the tubular shaft 128 is secured in adjusted position by means of the set screw 130 an additional disk cutter 131. Intermediate the ends of the tubular shaft 128 is a ring collar 132 for supporting the tubular shaft 128 on the outer end of the arm 126.

It should also be observed that at the lower end of the tubular shaft 67 there is adjustably secured by means of the set screw 133 an additional disk cutter 134. At the interior upper and lower portions of the hub 106 are rolling mill couplings 135 and 136, which are loosely mounted and connect the shafts 137 and 138 respectively to the rolling mill couplings 139 and 140. The couplings 135, 136, 139 and 140 are such as to allow the shafts 137 and 138 to have considerable play sidewise or from a vertical position. The tubular shafts 67 and 128 have a free sliding vertical motion on the couplings 139 and 140, but both must rotate whenever the shafts 137 and 138 are rotated. The couplings 135 and 136 are also such that although considerable play may be given to the shafts 137 and 138 rotary motion of the hub 106 will be transmitted to these shafts. In this instance I have shown the couplings 135, 136, 139 and 140 as each comprising four longitudinal fins or feathers on enlargements at the ends of the shafts 137 and 138. On the interior of the tubular shafts 67 and 128 are longitudinal slots in which these fins are slidable. By means of the nut 141 the worm 142, which is journaled vertically in bearings secured to the arm 112, may be turned to lift or lower the cutter carrying arm 126, because the worm engages a segmental worm gear 143 at the inner end of the arm 126, as shown in Fig. 1. It will therefore be seen that both the uppermost cutter carrying arm 65 and the lowermost cutter carrying arm 126 may be moved to various angular positions by means of the worm and worm gearing adjusting mechanism. Although I have shown five disk cutters spaced apart and arranged at different elevations, there may be a greater or less number of such cutters. For instance, an additional disk cutter could be easily connected to the intermediate frame 85 above or below the disk cutter 107 and secured in adjusted position by means of a set screw similar to the means of fastening the disk cutter 131 or 134 in position.

After the roof jack has been operated to hold the front portion of the mining machine firmly in fixed position and it is desired to start the cutting operation the various disk cutters should have their carrying frames properly adjusted. The lowermost cut must be level with the floor of the mine room, hence the stop 116 should be lowered and fastened in such adjusted position by means of the set screws 119. If the disk cutter 129 is not horizontal it may be rotated about the pivot 125 to such position by actuating the nut 141. The stop 115 should be moved so that it will engage the upper surface of the hub 114, and then fastened in adjusted position by means of the set screw 119. The cylindrical collar 80 can be moved up or down within certain limits to vary the position of the disk cutter 107. The sliding connections at the couplings 139 and 140 will permit free vertical adjustment of the frame 85. It will also be observed that the rod 86 is free to slide in the cylindrical opening 87 in the frame 63 and the inclosed cylinder 108 can be moved up or down over the piston 109. In some cases it is not of importance just where the cutter 107 makes its cut and therefore the tension of the spring 113 in the cylinder 108 may be varied by changing the elevation of the frame 85. By lifting the frame 85 the spring 113 will be put under greater tension and by lowering the frame 85 the spring 113 would have less tension. The uncounterbalanced portion of the weight of the arm 63 would then be carried on the uppermost arc-shaped surface by means of the roller 78, as indicated in Figs. 3 and 7. The cutters 68 and 134 may be arranged in horizontal position or given an angular or inclined position by actuating the nut 70. After all the various parts have been adjusted the current to the motor 97 may be turned on in the proper direction to rotate the various disk cutters in the direction indicated by the arrow 144 in Fig. 5. The cutting tools 146 will then cut horizontal kerfs into the mine wall, as shown in Fig. 3. The cutting tools 146 may be, and preferably are, removable or detachable from the cutting disks which carry them so that they may be conveniently removed and re-sharpened or a broken tool replaced. In order to advance the cutters the current to the electric motor 95 should be turned on in the proper direction to rotate the pinion 89 which meshes with the fixed gear 82. When the clutch 96 is thrown to effect the rotation of the pinion 92 the frame 85 will be slowly rotated in the direction indicated by the arrow 147 in Fig. 5. This motion of the frame 85 will be transmitted by means of the vertical rod 86 to the arm 63, the roller 78 of which will guide the arm 63 in the horizontal plane until the incline 79 is reached when the arm will descend. This descent will not be abrupt, however, because the spring 74 will cushion the action, and when a roller 78 again rides up the cam surface 79' shown in Figs. 2 and 7, the spring will facilitate the ascent because it acts in the manner of a counterbalance. It should be observed that the cam surfaces 79 and 79' should be so adjusted that when the horizontal kerfs in the mine wall are completed the arm 63 will be about to descend, and when a new cut is to be made the arm 63 will again ascend to its proper position.

As the frame 85 is rotated it carries with it the cylinder 108, and this acting on the piston 109 and the piston rod 110 will carry along the lowermost frame 112. It will therefore be seen that the coupling shafts 137 and 138 will be maintained in substantially vertical alinement with each other and in vertical alinement with the tubular shafts 67 and 128. The principal function of the particular type of coupling shown is to permit the uppermost and lowermost cutters to be moved to different angular planes either horizontal or inclined upwardly or inclined downwardly.

I prefer to mount on each of the cutter carrying arms or frames 63, 85 and 112 an electrically operated vertical disk cutter, as shown in Figs. 2, 5 and 8. These vertical disk cutters will make a cylindrically shaped kerf as shown at 148 in the diagram of Fig. 14, at the inner ends of the horizontal kerfs 149. A vertical cylindrical kerf made by a vertical disk cutter is also represented in Fig. 13. The arc-shaped dotted line 150, Fig. 13 represents the path that the vertical disk cutters will take in continuing the kerf 148.

The construction shown in Fig. 8, which is a plan sectional view of Fig. 3 taken on the line 8—8, is typical of the mechanism for supporting and operating the vertical disk cutters.

Extending laterally from the frame 85 as shown in Fig. 9 is a bracket 152, provided with a vertical opening therethrough into which fits the pin 153, which may be held in vertically adjusted position by means of the set screw 154. At the upper end of the pin 153 is securely attached the horizontal bar 151, at the outer end of which is a fork 156 for supporting the bearings 157, 157' for the worm 158. A crank 155 affords a means for turning the worm 158 manually. The worm 158 meshes with the worm gear 159, which is mounted for rotation on the bar 151. On the upper surface of the gear 159 at 160 is pivoted the rear end of the electric motor 161.

Extending from the motor frame is a comparatively long arm 163, as shown in Fig. 8, the outer end 164 of which forms a means of attaching and holding a bearing 165 for the outer end of the shaft 166. If desired, the bearing 165 may be held in position by means of the bolts 167.

The shaft 166 is preferably coupled to the shaft of the motor 161 by means of the coupling device 168, which will permit the shaft 166 to be removed when desired and replaced by another one. The shaft 166 is preferably made integral with the cutter disk 169. The cutters 170 and 170' may be separate and removable or integral with the disk. When the disk cutters 169 need repair the entire disk, together with the shaft 166, may be easily removed by withdrawing the coupling pin at the coupler 168 and inserting another shaft with a new or sharpened disk cutter thereon. By means of this construction the disk cutters may be quickly removed, thus saving considerable time. The horizontal disk cutters 134 and 131 are also readily removable and can be replaced by entire new disk cutters. In a similar manner the other horizontal disk cutters may be made removable.

Near the outer end of the arm 163 is pivoted at 171 a trailer, having a breaking down cam 173 at its outer and on the under side as shown in Figs. 2 and 8. There is also such a cam breaker on the upper side of the trailer 172, as shown at 174 in Fig. 2. This is for the purpose of breaking down the uppermost slab of coal to be mined. By referring to Figs. 2 and 14 it will be seen that when the horizontal and vertical kerfs are made there should be at least one such cam breaker for each slab of coal being cut. For instance, the cam 174 would be depended upon to break down the slab 175, and the cam 173' would be depended upon to break down the slab 176; the cam 173 would break down the slab 177, and the cam 173'' would break down the slab 178.

As shown in Fig. 2 the small electric motors 161, 161' and 161'' are pivoted at 160, 160' and 160'' to the upper surfaces of the worm gears 159, 159' and 159'', and are yieldingly held in a substantially horizontal position by means of the leaf springs 179, 179' and 179''. By thus having the small electric motors 161, 161' and 161'' yieldingly mounted, irregularities in coal or comparatively hard substances will not injure the cutting mechanism.

It should be understood that each unit for operating the vertical disk cutters may be lifted or lowered and held in adjusted position by means of a set screw such as that shown at 154 in Fig. 9. It should also be noted that each unit is adjustable to various radial positions. This radial adjustment is effected by means of the worms and worm gears and the cranks for manually turning the same. Each unit also has its motor yieldingly mounted, as shown at 179, 179' and 179'' in Fig. 2. Each unit also has a breaker arm pivoted to the arm which extends outwardly from the electric motor, as shown in Fig. 8. Each unit also comprises a bearing for the outer end of the cutter disk shaft and a coupling at its inner end by which the cutter and its shaft may be easily removed and replaced by a new one. I also prefer to pivot the trailers carrying the breaking down cams in such a way that they may have a limited oscillating movement whereby they will adjust themselves to the condition of the cuts and the material. This lost motion is limited by the shoulders 180, as illustrated in Fig. 8. The electric motors 161, 161' and 161'' being carried with the cutter frames 85, 63 and 112 respectively, will remain in substantially vertical alinement and it will therefore be easy to supply proper wiring for the same from the same source of supply that furnishes current to the feeding electric motor 95 and the cutter operating motor 97. Since the rotation of the cutter carrying frame is continuous the feed wire may be connected to electric slip rings on the ring 17 below the collar 118, where slip rings can be located, insulated from each other but connected to the wires which place the various motors in parallel to each other.

I will now describe the conveyer mechanism, for which I have filed a separate application Serial No. 296,867, filed May 13, 1919, for an improvement in loading machines. An endless chain 181, as shown in Fig. 5, provided with laterally extending flights 182, extends around the sprocket 183. An electric motor 184 is connected directly to the sprocket 183 to drive the same. The chain 181 runs in the grooves 185, 185' in the lateral faces of the longitudinal plate 14, as shown in Fig. 6. The forward portion of the endless chain 181 extends around the pulley 218 at the lower end of the post comprising the cylinder 10. The conveyer trough frame 44 is connected to the longitudinal plate 14 and is provided with vertical flanges 186 and 187, except at the portion below and near the cam 124. The rear portion of the trough 44 is supported directly on the connecting plate 42 and is slidable thereon, as shown in Fig. 3. Mounted upon the plate 42 by being secured thereto is a ball bearing swivel socket 188, in which is located the swivel or axle 189 of the bracket 190. To the rear end of the bracket 190 is pivoted the vertical arms 192, to the lower end of which is secured the extension 193 of the conveyer trough. It will be seen from Fig. 1 that this extended conveyer trough is curved upwardly so that mine cars may be run under the same. The lower end of the extension 193 is curved as indicated at 194 in Fig. 5, so as to make a turn-table connection with the rear end of the conveyer trough 44.

To the upper end of the pivoted bracket 190 is pivoted at 195 the screw-threaded rod 196, which extends loosely through the upper end of the lever arm 197, which is secured to the arms 192. By means of the wheel 198 on the screw-threaded portion of the rod 196, the arm 197 can be moved backward to effect the lifting of the extension conveyer trough 193. By turning the wheel 198 backward the conveyer trough extension 193 may be lowered.

In order to facilitate the lifting and lowering of the conveyer extension 193, I prefer to connect a cushioning device between the arm 197 and the pivoted support 190. This cushioning device comprises a cylinder 199 pivoted at 200 to the pivoted support 190, and a piston 201 which is connected to piston rod 202, the latter being pivoted at 203 to the bracket arm 197, as shown in Fig. 3. A spring 204 is located between the piston 201 and the end of the cylinder 199 opposite the pivotal point 200. The spring 204 counterbalances nearly all of the weight of the conveyer trough extension 193, so that by turning the wheel 198 the extension may easily be lifted. The uncounterbalanced weight of the extension should be sufficient, however, to lower the same against the action of the spring 204 when the wheel 198 is turned in a direction to release the arm 197.

I have not shown power operated or automatic mechanism for swinging the extension 193 about its pivot 189, as this can easily be done manually. The connection between the rear of the conveyer trough 44 and the extension 193 is maintained by the circular ends as indicated at 194. The parts at 194 are determined by the pivot 189 as a center. The conveyer chain 181 may be sufficiently slack and flexible to permit the desired lateral movement of the conveyer trough extension 193.

At the forward portion of the mining machine is a supplemental conveyer, as shown in Figs. 5, 10 and 11, comprising an endless chain 205, which is arranged to be operated by an electric motor 206. Attached to the chain 205 are laterally extending flights 207, which move in the conveyer trough 208, at the forward end of which is the vertical flange 209 joining the vertical flange 210. The forward portion 211 of the conveyer trough is hinged at 212, 212', so as to allow such forward portion to occupy a substantially horizontal position, although the main portion may occupy different inclinations, such, for instance, as that shown in Fig. 11.

The conveyer trough 208 and the parts mounted thereon, including the electric motor 206, are supported by means of the bracket arm 213, which extends laterally from the cutter frame 112, there being a pivotal connection at 214 between the arm 213 and the frame of the supplemental conveyer. This pivotal connection 214 will permit vertical motion of the lowermost cutter frame 112 and also of the rear portion of the supplemental conveyer while the forward portion of the latter remains on the floor of the mine. The forward lateral edge 215 of the supplemental conveyer trough will then exercise its maximum efficiency in acting as a scoop for collecting substantially all material in its path. As above intimated the supplemental conveyer must be lifted or elevated to such position that it will pass over the main conveyer during the portion of the rotation of the cutting mechanism when in non-cutting position, and for this reason I provide an arc-shaped cam 216, similar to the arc-shaped cam 124, this cam being positioned farther in the rear or behind the cam 124, as shown in Figs. 2, 3, and 5. When the lug 123 on the lower side of the cutter frame 112 engages the cam 124 the arm 213 will be lifted and therefore the rear portion of the supplemental conveyer will be lifted. When the lug 123 with respect to its center of rotation is about on the line 11—11, as shown in Fig. 10, the rear portion of the supplemental conveyer will be in the position represented in Fig. 11. During the lifting of the rear portion of the supplemental conveyer the outer or scoop end has been dragged toward the base plate 8, and therefore will be brought nearer the center of rotation, that is, the axis of the cylinder 10. At such time, however, the cutter frame 112 is substantially at its uppermost limit of travel and the outer or scoop end of the conveyer will be in position to engage and ride upon the cam 216 as the cutter frame 112 continues to rotate. The free end of the supplemental conveyer will thus be lifted up over the main conveyer. The parts are properly proportioned to insure the holding of the supplemental conveyer clear of the main conveyer. When the lug 123 becomes disengaged from the cam 124, the stop 116 still holds the cutter frame 112 in its elevated position. After the outer end of the supplemental conveyer leaves the cam 216 it may safely drop clear of the main conveyer. Then when the cutting operation is about to be repeated the stop 116 will be disengaged and the frame 112 will descend to its lowermost position as shown in Fig. 3, whereupon the rear end of the supplemental conveyer will again descend and engage the upper end of the flange 186 or outer wall of the conveyer trough. As the cutters are advanced to produce the horizontal and vertical kerfs the breakers on the trailers continue to break down the coal, which is scooped up and moved by means of the conveyer flights 207 on to the main conveyer, where the conveyer flights 182 move the coal to the extension 193 and thence out into the mine cars.

It should be understood that although the stop 116, by engaging the interlocking member 120 of the arm 112, holds the latter in its uppermost position even after the lug 123 runs off the cam 124 shown in Fig. 5, the arm 112 should drop to its lowermost position just as soon as the conveyer trough 44 is entirely cleared. This operation is desired so that the disk cutter 129 will be ready for operation just as soon as it approaches the wall of the mine. The supplemental conveyer trough 208 will also descend at its outer end while the lug 216 is still on the cam 124. But the lug 216 will not run off the cam radially, because the lug and cam are of sufficient width to prevent this. The lug 216 will finally run off the cam 124 and drop onto the flange or side wall 186 of the main conveyer trough 44, and continued rotation of the supplemental conveyer trough 208 will allow the latter to return to its lowermost position. It will therefore be seen that when the lug 123 first runs up on the cam 124, the rear end of the supplemental conveyer will be lifted to the position represented in Fig. 11. As soon as the arm 112 and the parts carried thereby are entirely clear of the conveyer trough 44, the arm 112 will drop and the rear end of the supplemental conveyer will also descend. The forward end of the supplemental conveyer, however, will still be elevated by the cam 124. Continued rotation of the supplemental conveyer will finally cause the forward portion thereof to reach its scooping position. As the horizontal disk cutters produce the horizontal kerfs, and the vertical rotary cutters produce the vertical kerfs, the trailers carrying the breaking-down cams are continually effecting the breaking off of the coal in large pieces, which fall onto the supplemental conveyer trough 208 and are conveyed by the flights 207 to the main conveyer trough while the flights 182 move the pieces of coal to the extension 193 and thence into the mine cars. It should be particularly observed that by employing the intermediate vertical disk cutters following the horizontal disk cutters, the coal may be broken down in large pieces. This is because a disk cutter can produce deeper cuts than tools which move in arcs of circles but do not rotate. In the construction shown in the drawings, a single rotary disk cutter produces a vertical kerf which extends both above and below the horizontal kerf and communicates with the latter. By referring to Fig. 14, it will be seen that the uppermost slab 175 and the lowermost slab 178 are not as thick as the intermediate slabs 176 and 177. The intermediate slabs can be made larger because of the rotary disk cutters which extend into the coal both above and below the horizontal kerfs. Furthermore, the additional weight of the larger intermediate slabs will assist in breaking them loose from the mine wall. By this method of mining coal, vertical arc-shaped kerfs are produced by rotary disk cutters at one operation, such vertical kerfs communicating with the horizontal kerfs to cut large intermediate slabs, which are broken down by means of the cams at the ends of the trailers loosely connected to the vertical disk cutter-carrying arms. Therefore, the horizontal kerfs are each completed by a single rotary disk cutter and each of the arc-shaped vertical kerfs is produced by a single vertical disk cutter. Only a single cam or wedge acts for breaking down a certain slab of coal which has been cut as indicated in Fig. 14. The method of mining is, therefore, such that by means of tools following each other closely the coal may be cut and broken down in large blocks and immediately conveyed by the supplemental conveyer onto the main conveyer and thence to the mine cars.

As soon as the cutting operation begins, the rear portion of the mining machine comprising the jacks 6, 6' is moved forward. This may be done even while the conveying operation is taking place. This will not interfere with the continued operation of the mining machine, because the fore portion thereof is securely held in position by means of the hydraulic jack 7. When the valve 220, in Fig. 6, is open and the exhaust valve 221 is also open and the supply valve 222 is closed, the plunger 37 will descend. In a similar manner, by opening the valve 223, the plungers 37' may be caused to descend. This will entirely loosen the rear roof jacks 6 and 6' and free the rear portion of the mining machine. Now, when the supply valve at 51, shown in Fig. 5, is open and the electric hydraulic pump is operated, the piston 46 in the cylinder 45, as shown in Fig. 3, will receive hydraulic pressure, as also will the forward inside end of the cylinder 45. The exhaust valve 52 being opened, the plate 42, together with the hydraulic jacks 6 and 6′, will be moved forward. The valves at 224 and at 222 may now be operated to secure supply pressure from the hydraulic pump, the valves 221 being closed but the valves 220 and 223 being open. The plungers 37 and 37′ may then be forced upwardly against the roof of the mine and firmly set in position so as to securely anchor the rear portion of the mining machine. After the kerfs have been cut in the wall of the mine at the head of the mining machine, and while the disk cutter frames are passing over the intermediate portion of the machine, the exhaust valve 32 may be opened to relieve the pressure in the cylinder 10 below the plunger 11. The latter will therefore descend and the shoe 13 will be released from the roof of the mine. Because of the sliding connection of the frame 63 with the vertical rod 86, and because of the rolling mill coupling 139, the plunger 11 may have free descent. By now letting in hydraulic pressure back of the piston 46 and relieving it ahead of the piston, the forward portion of the machine including the main conveyer trough and the base plate 8 together with the parts mounted thereon will be moved forward to a new cutting position. As soon as the forward portion of the machine has been moved to its new cutting position, the hydraulic pressure will be again exerted in the cylinder 10 to force the plunger 11 to its uppermost position. It will therefore be seen that as soon as the cutting of the kerfs is completed, the disk cutter 68 will descend. The latter will therefore be in a lower position while the arm 63 is swinging around over the plate 14 or the intermediate portion of the machine. As soon as the mine wall is approached by the cutters again, the plunger 11 will have been driven upwardly and the cutter 68 will be in position to begin a new cut farther into the mine wall. The operation is, therefore, such that as soon as the forward portion of the mining machine is anchored, the cutting operation of new kerfs will begin, and as soon as this takes place the rear portion of the machine is being loosened and moved to a forward position and then again firmly anchored. When the cutting of the kerfs is completed, the forward jack is again released and the forward portion of the machine moved forward and again anchored for positioning the machine so that new kerfs can be produced. The mining machine may, therefore, be operated continuously with little or no interruption, and the coal in large blocks may be conveyed away as soon as it is broken down and even while the rear portion of the machine is being moved forward to a new position.

Sometimes it is desirable to change the direction of movement of the entire mining machine. I have therefore provided the manually operable side jacks, comprising the shoes 55 and 55′. By referring to Fig. 12, it will be observed that if the sleeve 55′ and rod 53′ are lengthened out, the plate 33 together with the parts connected thereto will be shifted to the dotted line position 33′. It will then be evident that the conveyer trough 44 will also be shifted to a new position, as indicated by the dotted lines 44′ (Fig. 12). When the rear portion of the machine is thus shifted, and the hydraulic jacks 6, 6′ firmly anchor such rear portion of the machine, the forward motion of the forward portion of the machine will then be in a different direction. For instance, as indicated in Fig. 12, when the plate 33 and the parts thereto connected are shifted to the dotted line position 33′, the forward motion of the machine will be at an angle to and at one side of the previous line of movement. Therefore, by operating the one or the other of the jacks 55 or 55′, the path of intermittent travel of the mining machine may be varied as desired.

By connecting the brackets 217 and 217′ to the rear frame of the mining machine, as shown in Fig. 5, the rearward motion of the jacks 55 and 55′ may be limited so that the jacks may be adjusted to have such a length that when perpendicular to the rear frame they will scrape along the side walls of the room and prevent the rear portion of the machine from swerving out from a straight line of travel. As shown in Figs. 3 and 6, an air suction fan 225 is mounted on the horizontal plate 33. Directly connected to the suction fan 225 is an electric motor 226. The suction fan or blower 225 is connected by the pipe 227 to the flexible coupling 228, which in turn is connected to the elbow 229, the latter fitting into an opening 230 in the mine wall 231, as shown in Fig. 13. When the suction fan 225 operates, it draws the dust-laden air in the room where the mining operation is taking place, through the intake opening 232, shown in Figs. 3 and 5, and blows it through the opening 230 into the next adjacent room, as shown in Fig. 13. The holes 230 in the mine wall 231 may be produced by the boring tool 234, which is connected to be operated by the electric motor 235 mounted on the plate 33, as shown in Fig. 5. While the kerf cutters are operating and producing slack or coal dust, which floats in the air, the blower 225 is constantly taking such dust-laden air and blowing it into the next adjacent room. The electrically operated blower is therefore a means of ventilating the mine and of putting the coal dust into a place where it will not interfere with the mining machine or with the operator. At the same time that the room in which the mining operation is taking place is being ventilated, the boring tool 234 is producing a new opening through the wall 231. The new opening through the wall 231 may be located ahead of the opening through which the blower is sending the dust-laden air, any suitable or convenient distance, preferably a considerable distance so that the opening in service may serve the machine for a considerable portion of advance travel. It may, however, be located a distance about substantially equal to the travel that the forward portion of the mining machine takes when moved to a cutting position. Therefore, when the rear portion of the mining machine is moved forward, the elbow 229 will be in proper position to ventilate through the opening which has just been made through the mine wall. The opening which has just been left by the elbow can then be closed, by means of a plug 236, as shown in Fig. 13. Therefore, at the time that the cutting operation of the mining machine is taking place, as shown in Fig. 13, all of the openings back of the ventilator are plugged up and the opening by the tool 234 is still incomplete. Therefore, the only communication between the mining machine room and the next adjacent room is through the opening 230, through which the blower is operated.

The electric wiring for the machine is diagrammatically illustrated in the drawings—particularly in Figs. 2 and 3. The main supply wire 237 may be connected to a motor starter, or master controller, 238, from which the supply wire 239 extends along the center portion of the longitudinal plate 14 to a fixed circular ring as previously described mounted on the collar 17 and insulated therefrom. Above this fixed ring is a slip ring, insulated from the hollow post 10 and connected by the flexible wire 240 to the binding post 241 on the arm 212. The wire 240 may comprise convolutions so as to be sufficiently flexible to permit the arm 112 to rise or descend without interfering with the continuity of the circuit at the slip ring arrangement on the collar 17. A wire 242 extends upwardly from the binding post 241 to each of the various electric motors 95, 97, 161, 161' and 161''. Each of the electric motors may comprise a separate switch, which is represented by small rectangles. The outgoing terminal of each motor may be grounded to the machine, so that the current may be fed into the apparatus by the positive wire 237, and taken from the apparatus by the wire 243 (Fig. 3). The electric motors 235 and 226 may also be connected by a branch wire from the wire 239 and have its other terminal grounded to the machine. Each of these motors may also be supplied with separate switches. It will therefore be seen that each electric motor may be turned on or off, independently of any of the other electric motors. There is one common supply wire extending from the positive main to each of the electric motors. The master controller 238 may be used to turn on current when all the small electric motors are connected so as to immediately operate. It should be understood, however, that each motor may be turned on or off at its own switch. This will not interfere with the operation of the other motors, because there is a common supply wire and each motor has one terminal grounded to the framework of the mining machine. The motors are, therefore, connected in parallel, and are preferably shunt-wound motors. By mounting the electric motors upon the various cutter arms for separate and independent operation of the cutters, the efficiency of the apparatus is increased by the elimination of gearing, and because the operation of the mining machine is more easily controlled.

In Fig. 4, a modification is shown for permitting a lifting jack to be used for the forward portion of the mining machine. This lifting jack comprises a cylinder 244 and a plunger 245. The upper end 246 of the cylinder 244 is provided with a passage 247, which is controlled by the three-way valve 248, which may be operated by the manual wheel 249 outside of the cylinder 10. When the three-way valve 248 is moved to the position shown in Fig. 4, the passage 247 is closed, but the passage 24 then communicates with the upper end of the plunger 245. When hydraulic pressure is then exerted through the passage 24, the cylinder 244 will be lifted while the plunger 245 rests on the floor of the mine. When the pressure in the passage 24 is relieved, the weight of the forward portion of the mining machine will cause the latter to descend. In this way, the forward portion of the mining machine may be lifted or lowered, as desired, by means of this hydraulic jack. The valve 248 is so constructed that when desired the plunger 11 may be operated independently of the lifting jack, or both may be operated simultaneously, depending on which direction the valve 248 is turned. When it is desired to move the mining machine to another location in the mine, the lifting jack 5, shown in Fig. 4, may be operated to elevate the forward portion of the mining machine, and the hydraulic jacks 4 and 4' may be operated to lift the rear portion of the mining machine. The truck comprising the platform 1 and the wheels 2, as shown in Fig. 1, may then be run under the mining machine so that the latter may be transported easily on the truck 3 to another room or elsewhere in the mine. When transporting the mining machine on the truck to a new location, it is preferable to fold up the mining machine compactly, as shown in Fig. 1, by operating the cutter bracket arms until they occupy a position over the intermediate portion of the machine, when the current through the motors may be cut off entirely by moving the master controller switch back to initial or open position.

Obviously, those skilled in the art may make various changes in the details and arrangement of parts, without departing from the spirit and scope of the invention as defined by the claims, and I desire, therefore, not to be restricted to the precise construction disclosed.

Having thus described an embodiment of my invention, what I claim and wish to have secured by Letters Patent of the United States is:

1. In a mining machine, the combination with a hydraulic jack, of a cutter-carrying arm supported by the plunger of said hydraulic jack, an additional cutter-carrying arm supported by the cylinder of said hydraulic jack, cutting devices connected to said cutter-carrying arms, means for operating said cutting devices, and means for rotating said cutter-carrying arms.

2. In a mining machine, the combination with a hydraulic jack, of a cutter-carrying arm supported by the plunger of said hydraulic jack and movable up and down therewith, an additional cutter-carrying arm, cutting devices carried by said cutter-carrying arms, means for operating said cutting devices, and means for rotating the cutter-carrying arms.

3. In a mining machine, the combination with a hydraulic jack, of a cutter-carrying arm supported by the plunger of said hydraulic jack and movable up and down therewith, an additional cutter-carrying arm supported by the cylinder of said hydraulic jack for rotation about the same, cutting devices connected to said cutter-carrying arms, means for operating said cutting devices, and means for rotating said cutter-carrying arms.

4. In a mining machine, the combination with a hydraulic jack, of a cutter-carrying arm supported by the plunger of said hydraulic jack for rotation about the same, an additional cutter-carrying arm supported by the upper portion of the cylinder of the said hydraulic jack for rotation about the same, cutting devices connected to said cutter-carrying arms, means for operating said cutting devices, and means for rotating said cutter-carrying arms about said hydraulic jack.

5. In a mining machine, the combination with a vertical supporting post, of a cutter-carrying arm pivoted to said post and slidable vertically along the same intermediate the ends thereof, cutting devices connected to said cutter-carrying arm, a bracket connected to said post for supporting said cutter-carrying arm against gravity at different elevations, and a cushion between said bracket and said cutter-carrying arm to relieve the fall of said arm to a lower position as it slides down along said post.

6. In a mining machine, the combination with a supporting post, of a cup-shaped bracket on the outside of said post, a cutter-carrying arm pivoted to said post for free rotation about the same while supported thereon, a spring cushion between said cup-shaped bracket and said cutter-carrying arm, cutting devices connected to said cutter-carrying arm, and means for supporting the weight of said cutter-carrying arm by said cup-shaped bracket at varying elevations.

7. In a mining machine, the combination with a vertical post, of a cutter-carrying arm pivoted to said post for rotation about the same, cutting devices connected to said cutter-carrying arm, a bracket fixed to said post, a cushioning spring between said cutter carrying arm and said bracket, inclines and cams at the ends of the cutaway portion of said bracket, and a roller journaled in said cutter-carrying arm and resting on said bracket, the inclines and cams effecting various elevations of said cutter-carrying arm.

8. In a mining machine, the combination with a supporting post, of a cutter-carrying arm pivoted to the same, disk cutters connected to said cutter-carrying arm, a cup-shaped bracket mounted on said post and having a cut-away portion to form inclines, a roller journaled on said cutter-carrying arm and resting on the edges of said bracket rolling down or up the inclines to secure different elevations of said cutter-carrying arm and the disk cutters thereon, and a spring connected between the cutter-carrying arm and said bracket to cushion the descent of the cutter-carrying arm and facilitate its ascent.

9. In a mining machine, the combination with two frames movable relatively to each other, of independent hydraulic jacks for anchoring said frames, kerf cutting apparatus in an arc wholly supported by one of said jacks, means for feeding said cutting apparatus while the forward jack anchors its frame, and mechanism for moving either frame forward when the other is anchored, to secure forward feed of the mining machine.

10. In a mining machine, the combination with two frames movable relatively to each other, of hydraulic jacks for anchoring said frames, kerf cutter apparatus, cutter-carrying apparatus fixed to and supported by the forward jack, means independent of the forward jack for feeding the kerf cutter apparatus in an arc, and mechanism for shifting the position of one of said frames relatively to the other.

11. In a mining machine, the combination with two frames relatively movable and co-operatively connected together, of a hydraulic roof jack for anchoring the forward frame, kerf cutting apparatus associated with the forward frame, mechanism for feeding said cutting apparatus in substantially horizontal planes while said hydraulic roof jack remains in anchoring position, hydraulic anchoring mechanism for the rear frame, and hydraulic apparatus connected to said frames for shifting the positions thereof relatively to each other.

12. In a mining machine, the combination with two frames relatively movable, of cutting apparatus associated with the forward frame, a hydraulic jack on the forward frame for holding the latter stationary while said cutting apparatus operates, a hydraulic jack for the rear frame, a hydraulic pump on the rear frame, a hydraulic motor for shifting either frame relatively to the other, means for controlling the jack on the rear frame to hold the latter stationary while the forward frame is moved forward, a pivotal connection between the two frames to permit the rear frame to be swung on the forward frame, and a flexible hydraulic connection between the hydraulic pump and the hydraulic jack on the forward frame.

13. In a mining machine, the combination with two frames movable relatively to each other, of anchoring jacks for said frames, cutting apparatus mounted on one of said frames for cutting a plane kerf in a mine wall, means for operating said cutting apparatus including the feeding thereof independently of movement of either of said frames, and mechanism for shifting the position of one of said frames relatively to the other.

14. In a mining machine, the combination with a rotating cutter-carrying arm, of cutting mechanism carried by said arm, a post on which said cutter-carrying arm is pivoted for rotation, conveying mechanism associated with said post for conveying away the material mined, and means for lifting said cutter-carrying arm when passing over said conveyer.

15. In a mining machine, the combination with a cutter-carrying arm, of means for rotating said cutter-carrying arm, a plane kerf cutter mounted on said cutter-carrying arm, an upright kerf cutter traveling back of said cutter-carrying arm, means for operating said kerf cutters, and breaking-down means following said upright kerf cutter and operating in the kerf produced by said upright kerf cutter.

16. In a mining machine, the combination with a forward base plate resting on the ground, of a vertical post mounted thereon, cutting apparatus mounted on said post intermediate its ends, a frame pivoted to the lower portion of said post above said base plate, and means at the rear portion of said frame to shift the position of the latter by oscillating it about said post to change the forward travel of the cutting apparatus to a new cutting position when moved forward after such adjustment.

17. The combination with a mining machine, of two jacks pivoted at the rear portion of the mining machine for adjustment to positions extending diagonally forward, and abutments on said mining machine to limit the rearward movement of said jacks relatively to said mining machine to positions substantially at right angles to the longitudinal axis or line of forward travel of said mining machine to cause said jacks to serve as guides when the mining machine is moved forward.

18. In a mining and loading machine, the combination with cutting apparatus, of means for operating said cutting apparatus including swinging feeding movement through an arc of 180 degrees or more, a conveyer adapted to follow the path of movement of said cutting apparatus to receive dislodged material, and an additional conveyer having a receiving end continually in delivery communication with said first-named conveyer while the delivery end of said additional conveyer is held over a predetermined loading position.

19. The combination with horizontal kerf-cutting mechanism for producing an under cut in a mine wall, of a main frame, a supplemental frame for supporting said kerf-cutting mechanism, means for completely rotating said supplemental frame, means for operating said cutting mechanism for cutting material during a portion of the rotary travel of said supplemental frame, mechanism for elevating the supplemental frame and said cutting mechanism during a portion of the rotary travel of said supplemental frame while guiding said cutting mechanism over said main frame, and means for advancing said main frame while said cutting mechanism is moved over the same.

20. In a mining machine, the combination with cutting apparatus, of a frame for supporting the same, means for holding said frame in fixed position during the operation of said cutting mechanism, a second frame pivoted to said first named frame, means for advancing said first named frame together with the cutting apparatus step by step for new positions of cutting, and means for changing the position of said second frame about its pivotal connection with said first named frame to change the direction of travel of said first named frame and the cutting apparatus connected thereto.

21. In a mining machine, the combination with cutting mechanism, of vertical anchoring mechanism, a frame pivoted to said anchoring mechanism, means for completely rotating said cutting mechanism horizontally about said anchoring mechanism, apparatus for turning said frame about its pivotal connections with said anchoring mechanism, and means for advancing said cutting mechanism in a direction depending upon the pivotal adjustment of said frame.

22. The combination of a mining machine including two relatively movable interconnected frames, anchoring means for the forward frame forming a pivot about which the other frame may be rotated, means for advancing the rear frame while the forward frame is anchored, and means operating in conjunction with said advancing means for rotating the said other frame about said pivot.

23. The combination of a mining machine including two frames relatively movable longitudinally and horizontally over a mine floor, a cutting apparatus mounted on the forward frame, a single upright roof jack substantially in the center of the forward frame for anchoring the latter, means for operating said cutting apparatus while the forward frame remains anchored, a plurality of upright spaced apart roof jacks for anchoring the rear frame, and mechanism for advancing either of said frames while the other is anchored.

24. In a mining machine, the combination with two relatively movable frames each adapted to rest on the flat floor of a mine chamber to hold itself in an upright position by its own weight and without being anchored, of cutting apparatus on one of said frames operable when such frame is held in fixed position, a single roof jack substantially in the center of the forward frame, a pair of roof jacks spaced apart transversely of the line of travel of said machine for anchoring the rear frame and for preventing the machine from changing its course of travel, and mechanism for advancing the forward frame while the rear frame is anchored.

25. In a mining machine, the combination with cutting mechanism, of a frame for supporting said cutting mechanism for movement in an arc, means for operating said cutting mechanism including the feed thereof in an arc, a post to which said frame is pivoted and on which it is slidable longitudinally thereof, and means for automatically shifting the plane of rotation of said frame with the cutting mechanism thereof by directing the frame with the sliding movement along said post.

26. In a mining machine, the combination with a plurality of rotary cutting devices operating in superposed parallel planes during the cutting operations, of supporting means for said cutting devices, and means in position on said supporting means to coact with said devices upon rotation thereof to effect automatic shifting of said cutting devices to different planes of rotation relatively to each other while maintaining the same in substantially parallel planes.

27. The combination of a plurality of kerf-cutting devices rotatable in given superposed parallel planes during a predetermined portion of their travel, a common support for said cutting devices forming a common center about which said cutting devices rotate, and means for automatically shifting the cutting devices farthest removed from each other along their common support and into different planes of rotation during a predetermined portion of their travel and relatively to the intermediate cutting devices, while being maintained in planes parallel therewith.

28. In a mining machine, the combination with a rotary cutter carrier, a horizontal kerf cutter mounted on said carrier, a supplemental carrier supported wholly by said first named carrier, a vertical kerf cutter mounted on said supplemental carrier to follow the horizontal kerf cutter at the bottom of the latter's cut, a motor mounted on said first named carrier to operate said horizontal kerf cutter, and an additional motor mounted on said supplemental carrier to operate said vertical kerf cutter independently of the operation of said horizontal kerf cutter.

29. The combination of a plurality of rotary arms, a common support for said arms, mechanism common to said arms for rotating them, a plurality of horizontal cutters carried by said arms, an independent common mechanism for actuating said horizontal cutters, individual vertical cutters carried by said arms, and individual motors for driving said vertical cutters.

30. In a mining machine, the combination with cutting mechanism, of means for operating the same, a hydraulic jack comprising a base frame and a vertical cylinder, a plunger in said cylinder for engaging the roof of a mine chamber to hold said base frame and cylinder in fixed position, a carrier for said cutting mechanism and said operating means, means for pivotally supporting said carrier at the upper portion of said standard, means for controlling said operating means from a distance, means for controlling the actuation of said plunger from a distance, and frame-work connected to said base frame for supporting both of said controlling means away from the operating range of said cutting apparatus.

31. In a mining machine, the combination with a hydraulic post anchoring device having a base frame, of kerf cutting mechanism, means for operating the same, a carrier for said kerf cutting mechanism and said operating means, said carrier being pivotally mounted on said hydraulic post anchoring device above said base frame and supported wholly by said anchoring device for complete rotation about the same, and means connected with said base frame for pushing the latter forwardly over a mine floor together with the said anchoring device and the parts carried thereby to a new cutting position.

32. In a mining machine, the combination with a vertical support, of a cutter carrying arm pivoted to said support, kerf cutting devices connected to said cutter carrying arm, and a bracket on said support for directing said cutter carrying arm into a different plane of movement away from the material during the rear portion of the pivotal movement of said cutter carrying arm while maintaining the latter in a plane parallel to its position when in its forward portion of pivotal movement.

33. In a mining machine, the combination with a supporting post, of a cutter-carrier pivoted thereto, said cutter carrier being slidable longitudinally of the said supporting post, cutting devices mounted on said cutter-carrier, means for operating said cutting devices, a circular bracket mounted on said post, and extensions on said bracket for controlling the position of said cutter-carrier longitudinally along said post.

34. In a mining machine, the combination with a supporting post, a cutter-carrier pivoted to said post and slidable along the same, cutting mechanism connected to said cutter-carrier, a circular bracket connected to said post, means for imparting a feeding movement to said cutter-carrier and cutting mechanism, and a cam on said bracket for sliding said cutter-carrier and cutting mechanism along said post and holding the same in an elevated position during the cutting operation of said cutting mechanism.

35. In a mining machine, the combination with a support, of a plurality of cutter-carriers individually pivoted to said support, cutters one mounted on each of said cutter-carriers, driving connections directly between said cutters themselves, means for operating said cutters, and means for imparting a feeding movement to said cutter-carriers.

36. In a mining machine, the combination with a support, of a plurality of cutter-carriers pivoted to said support, rotary cutting devices one mounted on each of said cutter-carriers, flexible driving connections directly between the cutting devices of one cutter-carrier and the cutting devices of the next adjacent cutter-carrier, means for operating said cutting devices through said direct connections, and means for imparting a feeding movement to said cutter-carriers.

37. In a mining machine, the combination with a supporting post, of a base plate, a cutter carrying arm pivotally mounted on said post entirely above said base plate, so as to be supported directly by said supporting post, kerf cutting mechanism mounted on said arm in a horizontal plane, means for operating said cutting mechanism, an additional cutter carrying arm pivotally mounted on said post separate from said first named cutter carrying arm and also above said base plate and thereby supported directly by said post, driving connections for moving said arms to effect the feed of said cutting mechanism, additional kerf cutting mechanism mounted on said additional arm in a horizontal plane, and direct driving connections between said respective cutting mechanisms.

38. In a mining machine, the combination with a support, of a cutter carrier pivotally mounted on said support, a kerf cutter on said carrier and individual thereto, an additional cutter carrier pivotally mounted on said support, an additional kerf cutter mounted on said additional carrier and individual thereto, said additional kerf cutter being in a plane parallel with said first named kerf cutter and spaced apart therefrom, direct driving connections between said cutters, means for moving both of said arms in unison on their pivots to secure feeding movement of said cutters in parallel spaced apart planes, and means for operating said cutters during such feeding movement.

39. In a mining machine, the combination with a support, of a plurality of spaced apart cutter-carrier arms pivoted to said support in parallel planes, means for imparting feeding movement to said arms, individual cutters carried by said arms, means for operating said cutters, and automatic mechanism for effecting the movement of one of said arms and its cutter into a new plane while being maintained in a plane parallel to that of the next adjacent arm.

40. In a mining machine, the combination with a post, of a plurality of spaced apart cutter-carrying arms mounted on said post for pivotal motion thereon, one of said arms also having a sliding motion on said post, means for imparting feeding movement to said arms, cutters carried by said arms, means for operating said cutters, and a cam for controlling the position of one of said arms along said post while always being maintained in planes parallel to the other arm or arms and during the pivotal movement of the same.

41. In a mining machine, the combination with a support, of two cutter-carrying arms pivoted to said support so as to always move in parallel planes, cutters carried by said arms, means for operating said cutters, a rod mounted on one arm and engaging the other arm to compel said arms to move on their pivots in unison, a cam for controlling the variation of distances between said arms during the pivotal movement of the same, and means for imparting feeding movement to said arms.

42. In a mining machine, the combination with a post, of two cutter-carrying arms pivoted thereto, one of said arms being slidable along said post so as to be always in a plane parallel to the plane of the other arm, cutters carried by said arms, means for operating said cutters, a rod mounted on one arm and extending into a recess in the other arm to compel both of said arms to move on their pivots in unison, a cam for supporting one of said arms at varying elevations, during the pivotal movement of the same, and means for imparting feeding movement to said arms.

43. In a mining machine, the combination with an anchoring jack, of a cutter-carrying arm pivoted thereto, an electric motor carried by said arm and moving therewith, mechanism operated by said motor for imparting a feeding movement to said arm, said feeding mechanism comprising a member carried by said jack, a cutter carried by said arm, an additional electric motor carried by said arm and moving therewith, mechanism operated by said additional motor for operating said cutter independently of the feeding movement of said arm, and means for advancing said cutter-carrying arm during the operation of said cutter and while said anchoring jack is released.

44. In a mining machine, the combination with a support, of a cutter carrying arm pivoted to said support, an electric motor carried by said arm, turntable gearing between said motor and said support for moving said arm on its pivot when said motor is operated, said turntable gearing comprising a gear fixed to and carried by said support, a plane kerf cutter carried by said arm, an additional electric motor carried by said arm, gearing between said additional electric motor and said plane kerf cutter for operating the latter when said additional motor is operated to cut a kerf in a plane transverse of the axis of said support, and means for controlling said electric motors from a distance.

45. In a mining machine, the combination with a plurality of parallel spaced apart plane kerf cutters, of adjustable supporting means therefor, and means for operating said cutters, said operating means comprising a flexibly connected shaft directly between said plane kerf cutters.

46. In a mining machine, the combination with a plurality of spaced apart kerf cutters, of a support, a plurality of cutter-carrying arms mounted for pivotal movement on said support and sliding movement along the same, means for automatically regulating the distances between said arms along said support during the rotation of said arms, and means for maintaining driving connections between said kerf cutters for the various adjustments of said arms.

47. In a mining machine, the combination with a support, of a plurality of kerf-cutters, arms for carrying said kerf cutters at the outer ends thereof spaced apart and in parallel planes, automatic means for adjusting said arms along said support to vary the spacing between said kerf cutters while maintaining them in position while in operation in parallel planes, and means for operating said cutters through direct connections between the centers of said rotary kerf cutters.

48. In a mining machine, the combination with a plurality of spaced apart plane kerf cutters whose axes are subject to displacement, of means for operating the same comprising a flexible direct driving connection between said plane kerf cutters, and supporting structure for said plane kerf cutters.

49. In a mining machine, the combination with a plurality of parallel spaced apart plane kerf cutters, of means comprising a flexible direct driving connection between said plane kerf cutters for operating the latter, means for adjustably supporting said plane kerf cutters, and mechanism for feeding said supporting means during the operation of said plane kerf cutters.

50. In a mining machine, the combination with a support, of a cutter-carrier pivoted to said support, a kerf cutter mounted on said carrier, means for operating said kerf cutter, mechanism for imparting a feeding movement to said cutter-carrier, an additional cutter-carrier pivotally mounted, a connection between said cutter carriers for transmitting feeding movement to said additional cutter-carrier, an additional kerf cutter mounted on said additional cutter-carrier, means for effecting variation of the spacing between said cutter-carriers during such feeding movement, and means for maintaining driving connection between the kerf cutter on said first named cutter-carrier and the kerf cutter on said additional cutter-carrier, for all positions of the latter.

51. In a mining machine, the combination with a support, of a cutter-carrier pivoted thereto, a kerf cutter mounted on said cutter-carrier, means for operating said kerf cutter, an additional cutter-carrier pivoted to said support, an additional kerf cutter mounted on said additional carrier, a device connected to one of said carriers and engaging the other carrier, means for imparting feeding movement to said carriers, a cam connected to said support for varying the elevation of said additional carrier together with the kerf cutter mounted thereon, and a shaft connected at its ends loosely to the centers of said kerf cutters and having a sliding connection at one of its ends with the center of the kerf cutter mounted on said additional carrier.

52. In a mining machine, the combination with a support, of a cutter carrier pivoted to said support and slidable along the same, a kerf cutter mounted on said carrier, means for operating said kerf cutter, means for feeding said carrier rotatively on said support, and mechanism for positively holding said carrier from sliding movement along said support during the predetermined feeding travel of said cutter carrier.

53. In a mining machine, the combination with a support, of a cutter-carrier pivoted thereto, a device for holding said carrier in a depressed position by preventing upward movement of said carrier during a predetermined path of travel thereof, means for elevating said carrier automatically when released from said holding device, a cutter mounted on said carrier, means for operating said cutter, and mechanism for imparting a feeding movement to said cutter carrier.

54. In a mining machine, the combination with a cutter-carrier, of a cutter mounted thereon, means for operating said cutter, a support to which said cutter-carrier is pivotally connected, mechanism for positively holding said cutter-carrier from movement in any direction on said support except rotatively during a predetermined path of travel of said cutter-carrier, and means for elevating said carrier automatically together with the cutter mounted thereon when said carrier is released from said holding position.

55. In a mining machine, the combination with a support, of a cutter-carrier pivoted thereto, a cutter mounted on said cutter-carrier, means for operating said cutter, means for varying the position of said cutter-carrier and the cutter thereon during the path of travel of said cutter-carrier, an arm pivoted to said support, a dash pot connected between said cutter-carrier and said arm, and means for imparting a feeding movement to said cutter-carrier.

56. In a mining machine, the combination with an upright support, of a cutter-carrier pivoted to said support for movement thereon, cutting mechanism mounted on said carrier, means for operating said cutting mechanism, a device for positively preventing upward movement of said cutter-carrier during a predetermined pivotal movement thereof on said support, and a spring connected to said carrier tending to elevate the same when released from said device.

57. In a mining machine, the combination with a vertical support, of a cutter-carrier pivoted thereto, an under-cutting kerf cutter mounted on said carrier, means for operating said cutter, mechanism for elevating said carrier during a predetermined portion of its travel, means for imparting a feeding movement to said carrier, and a cushion acting on said carrier when dropped from said elevating mechanism.

58. A mining machine comprising an upright support, a cutter-carrier pivoted thereto, a kerf-cutter mounted on said carrier, means for operating said kerf-cutter, cam mechanism for elevating said cutter during a predetermined portion of its travel while being restored to initial cutting position, and an additional device for holding said cutter-carrier in elevated position after said carrier runs off from said cam mechanism and during another portion of such path of travel of said carrier immediately preceding its initial cutting position.

59. A mining machine comprising a vertical support, a cutter-carrier pivoted thereto, a kerf cutter mounted on said carrier, means for operating said cutter, cam mechanism for elevating said carrier during a predetermined portion of its path of travel, a device for holding said carrier in elevated position after leaving said cam mechanism and for another predetermined portion of the path of travel of said carrier, and a cushion for relieving the dropping of said carrier after running off said device.

60. A mining machine comprising a support, a cutter-carrier pivoted thereto, a kerf cutter mounted on said carrier, means for operating said cutter, cam mechanism for elevating said cutter-carrier during a predetermined portion of the travel thereof, a device for holding said carrier in elevated position after leaving said cam mechanism, means for cushioning the dropping of said cutter-carrier after leaving said holding device, and mechanism for confining the cutter-carrier against movement up or down during another predetermined portion of the rotative travel of said cutter-carrier.

61. In a mining machine, the combination with a post, of a cutter-carrier pivoted thereto, a kerf cutter mounted on said carrier, means for operating said kerf cutter, means for imparting a rotative feeding movement to said cutter-carrier about said post, cam mechanism for sliding said carrier upwardly on said post to elevate the kerf cutter during a predetermined portion of the rotative travel of said carrier, a bracket fixed to said post acting on said carrier to hold the same in elevated position after running off said cam mechanism, a dash pot spring cushion device for relieving or counterweighting the dropping of said carrier after leaving said holding bracket just prior to the beginning of the cutting operations on the mine wall, and an additional bracket mounted on said post coöperating with said first named bracket for holding said cutter-carrier firmly in position on said post against movement up or down while permitting free rotative movement during a predetermined portion of travel of the carrier while the kerf cutter is cutting a kerf in the mine wall.

62. In a mining machine, the combination with a support, of a cutter-carrier pivoted thereto, a cutter mounted on said carrier, means for operating said cutter, an arm pivoted to said support, a connection between said arm and said cutter-carrier, means for imparting a feeding movement to said arm and said cutter-carrier, to move the same in parallel planes in unison, means for controlling the spacing of said cutter-carrier from said arm to effect movement of said cutter to different planes all parallel to each other, and a cushion embodied in said connection between said arm and said cutter-carrier.

63. In a mining machine, the combination with a support, of a plurality of cutter-carrying arms pivoted to said support, driving connections between said cutter-carrying arms, means for imparting a feeding movement simultaneously to said cutter-carrying arms, a plurality of rotary kerf cutters, one rotatably mounted on each of said cutter-carrying arms, means effecting the lowering of the uppermost cutter-carrying arm and its rotary cutter and the elevation of the lowermost cutter-carrying arm and its rotary cutter during a predetermined portion of travel of the cutter carrying arms, flexible driving connections between said rotary kerf cutters, and means for operating all of said kerf cutters simultaneously.

64. In a mining machine, the combination with a support, of a cutter-carrier mounted thereon having sections relatively adjustable, a kerf cutter pivotally mounted on said carrier and having a hollow hub with longitudinal slots on its inner surface, a shaft, a head connected to said shaft and engaging said slots and slidable along the same, means for rotating said shaft and said head to impart rotary motion to said kerf cutter, and means for adjusting the relative positions of the sections of said cutter-carrier without interfering with the mechanism for rotating said kerf cutter.

65. In a mining machine, the combination with a frame, of cutting apparatus supported thereon, means for operating said cutting apparatus, a hydraulic seating jack for said frame, an additional frame pivoted to said first named frame, hydraulic seating mechanism for additional frame, means for moving said frames into position for a cutting operation, mechanism for swinging said additional frame on its pivot to change the forward travel of said first named frame, and means for controlling said jacks and said moving means for individual means.

66. In a mining machine, the combination with a support, of cutting apparatus and breaking down mechanism pivotally connected to said support, means for operating said cutting apparatus and breaking down mechanism to dislodge crescent shaped masses of material from its native bed, a main conveyer, a supplemental conveyer pivotally connected to said support and following said cutting apparatus and breaking down mechanism, and means for directing broken down material from the floor of the mine onto said supplemental conveyer for movement thereby to said main conveyer.

67. In a mining machine, the combination with a support, of cutting apparatus pivotally connected thereto, means for operating said cutting apparatus, a main conveyer, a supplemental conveyer pivotally connected to said support and following said cutting apparatus, and a scoop for directing the cut material from the floor of the mine onto said supplemental conveyer, the latter moving it onto the main conveyer.

68. In a mining machine, the combination with a support, of kerf cutting apparatus for producing a plurality of horizontal kerfs in a mine wall, a plurality of vertical kerf cutters operating at the inner ends of the kerfs produced by said horizontal kerf cutters, breaking down mechanism following said vertical kerf cutters, means for operating and feeding all of the aforesaid kerf cutters, a main conveyer, and a supplemental conveyer pivotally connected to said support and following said kerf cutters and breaking down mechanism to move the material dislodged by said kerf cutters and said breaking down mechanism onto said main conveyer.

69. A mining and loading machine comprising supporting frame-work, a main conveyer mounted on said frame-work, a supplemental conveyer pivoted to said frame-work, means for imparting a rotary motion to said supplemental conveyer as a whole, mechanism for effecting the elevation of said supplemental conveyer when passing over said main conveyer, and means connected to said frame and operating ahead of said supplemental conveyer for dislodging material from a mine wall to be received by said supplemental conveyer and moved onto said main conveyer.

70. A mining and loading machine comprising a supporting frame, a main conveyer mounted thereon, a supplemental conveyer connected to said frame to communicate with said main conveyer, means for swinging said supplemental conveyer over a predetermined path of travel while maintaining operative communication with said main conveyer, a scoop moving with said supplemental conveyer during its swinging movement for directing material thereon, and means connected to said frame and operating ahead of said supplemental conveyer to dislodge material from a mine wall to be scooped up and moved by said supplemental conveyer onto said main conveyer.

71. A mining and loading machine comprising a supporting frame, a main conveyer mounted thereon, a supplemental conveyer connected to said frame to communicate with said main conveyer, means for swinging said supplemental conveyer over a predetermined path of travel while maintaining operative communication with said main conveyer, means connected to said frame for dislodging from a mine wall the material into position to be received by said supplemental conveyer and moved onto said main conveyer, and mechanism for effecting the elevation of said supplemental conveyer when being moved over said main conveyer.

72. In a mining machine, the combination with a support, of a cutter-carrier pivoted to said support, a cutter mounted on said carrier, means for operating said cutter, a main conveyer connected to said support, a supplemental conveyer pivoted to said carrier compelling its rear portion to move up and down with said carrier, means for feeding said carrier and swinging said supplemental conveyer while the latter maintains operating connection with said main conveyer, and cam mechanism for lifting both said carrier and said supplemental conveyer above said main conveyer when passing over the same toward initial operating position of said cutter.

73. A mining and loading machine comprising a main conveyer, a supplemental conveyer, means for operating said main conveyer, an individual motor mounted on said supplemental conveyer for operating the same, means for swinging the supplemental conveyer while maintaining operating connection with said main conveyer, and means ahead of said supplemental conveyer for dislodging from a mine wall the material received by said supplemental conveyer and moved thereby onto said main conveyer.

74. In a mining machine, the combination with a frame, of a main conveyer mounted on said frame, cutting mechanism pivotally mounted on said frame to swing through an arc of 180° or more, and a supplemental conveyer mounted on said frame behind said cutting mechanism to swing through an arc of 180° or more and arranged to deliver dislodged material to the said main conveyer at any position of its arcuate travel.

75. In a mining machine, the combination with a jack comprising relatively movable members, of a cutter-carrying arm supported by one of said members, an additional cutter-carrying arm supported by the other member, cutting devices connected to said cutter-carrying arms, and means for operating said cutting devices.

76. In a mining machine, the combination with a jack comprising a plunger and a cylinder, of a cutter-carrying arm carried by the said plunger and movable therewith, an additional cutter-carrying arm carried by the said cylinder, cutting devices carried by said cutter-carrying arms, and means for operating said cutting devices.

77. In a mining machine, the combination with a jack, of a cutter-carrying arm pivoted to said jack and slidable along the same, cutting mechanism connected to said cutter-carrying arm, means for effecting a sliding movement of said arm back and forth along said jack, and means for operating said cutting mechanism.

78. In a mining machine, the combinaton with a supporting post, of a cutter-carrying arm pivoted to said post and slidable along the same, means for effecting the sliding movement of said arm along said post in a predetermined relation to the rotation of said arm, a cutter on said arm, and means for operating said cutter.

79. In a mining machine, the combination with a cutter-carrying arm, of a supporting post along which said arm is slidable, a kerf cutter on said arm in a plane substantally at right angles to the axis of said post, means for operating said cutter, and means for sliding said arm along said post to move the cutter into parallel planes also substantially perpendicular to the axis of said post.

80. In a mining machine, the combinaton with a vertical supporting post, of a cutter-carrying arm pivoted to said post and slidable along the same, cutting mechanism connected to said cutter-carrying arm, means for operating said cutting mechanism, and a cup-shaped cam bracket for directing the up and down sliding movements of said arm along said post.

81. In a mining machine, the combination with a post, of a cutter-carrying arm pivoted to said post and slidable along the same, cutting mechanism on said arm, means for operating said cutting mechanism, a circular bracket for directing such sliding movement, and a cushion between the arm and said bracket for relieving the fall of said arm to a lower position.

82. In a mining machine, the combination with a post, of a cutter-carrying arm pivoted to said post and slidable along the same, a cup-shaped circular cam bracket fixed to said post to direct such sliding movement, and a cushioning device between said arm and said bracket and having a part movable relatively to said arm and pivoted to said post.

83. In a mining machine, the combination with a frame, of a hydraulic jack therefor, cutting apparatus connected to said frame, means for operating said cutting apparatus, an additional frame connected to said first named frame and movable relatively thereto, a fluid pressure passage on said additional frame, flexible pivoted fluid passage connections between said additional frame passage and said jack, means for holding said additional frame in fixed position, means for exerting force between said frames, and means for operating said hydraulic jack, said holding means and said force-exerting means.

84. In a mining machine, the combination with cutting apparatus, of means for operating the same, a forward frame for supporting said cutting apparatus, a hydraulic jack for said forward frame, a rear frame pivoted to said forward frame, means for holding said rear frame in fixed position, a fluid pressure passage fixed to said rear frame, a flexible connection between said fixed passage and said jack, means for exerting force between said frames, and means for operating the latter and said hydraulic jack and said holding means.

85. In a mining machine, the combination with cutting apparatus, of means for operating the same, a forward frame for supporting said cutting apparatus, a rear frame pivoted to said forward frame, means for holding the rear frame in fixed position, means for exerting force between said frames, a fixed fluid passage on said rear frame, a fixed passage on said forward frame, a hydraulic jack in communication with said forward passage, pivoted flexible connections between said fixed passages, said hydraulic jack being in position to hold said forward frame, and means for operating said holding means, said hydraulic jack, and said force-exerting means.

86. In a mining machine, the combination with cutting apparatus, of means for operating the same, a forward frame for said cutting apparatus, a hydraulic jack for said forward frame, a rear frame connected to said forward frame and movable relatively thereto, a fixed passage on the rear frame, a flexible connection underneath the upper surface of said rear frame between said jack and said fixed passage, means for holding the forward frame in fixed position, and means for exerting force between said frames.

87. In a mining machine, the combination with cutting mechanism, of means for operating the same, a forward frame for said cutting apparatus, a hydraulic jack for said forward frame movable relatively to said forward frame, a rear frame, a series of pipes pivoted to each other and to said frames, fixed passages to communicate fluid pressure from said rear frame to said hydraulic jack, means for holding the rear frame in fixed position, and means for exerting force between said frames.

88. In a mining machine, the combination with cutting apparatus, of means for operating the same, a base frame for said cutting apparatus, a rear frame movable relatively to said base frame, a hydraulic jack for said base frame, fixed passages in said frames, a flexible connection between said fixed passages, means for holding said rear frame in fixed position, and means for exerting force between said frames.

89. In a mining machine, the combination with cutting apparatus, of means for operating the same, two relatively movable connected frames, hydraulic jacks one for each of said frames, said cutting apparatus being mounted on said last named frame, a fixed fluid pressure passage on the other frame, a flexible fluid pressure connection between said jack and said fixed passage and extending into a recess in said other frame, and means for exerting force between said frames.

90. In a mining machine, the combination with cutting apparatus, of means for operating the same, a forward frame for said cutting apparatus, a hydraulic jack connected to the center of said frame, a rear frame, movable relatively to said forward frame, fixed passages in said frames, pipes pivotally connected to each other and to said fixed passages, means for holding said rear frame in fixed position, and means for exerting force between said frames.

91. In a mining machine, the combination with cutting apparatus, of means for operating the same, a circular base frame, a hydraulic jack connected to the center thereof, said cutting apparatus being mounted on said jack, an additional frame pivoted to said base frame, fixed passages in said frames, pipes pivotally connected to each other and to said passages and movable laterally in a recess beneath the surface of said additional frame, means for holding said additional frame in fixed position, and means for exerting force between said frames.

92. In a mining machine, the combination with cutting apparatus, of means for operating the same, a frame for said cutting apparatus, a hydraulic jack for said frame, a conveyer frame pivoted to said first named frame, means for holding said conveyer frame in fixed position, a fixed fluid pressure passage on said conveyer frame, means for exerting force to move said conveyer frame, a flexible connection between said fixed passage and said jack, and a hydraulic motor connected to said fixed passage for transmitting fluid pressure through said first passage, and said flexible connection to said jack to operate the latter.

93. In a mining machine, the combination with a cutter-carrying arm, of kerf cutting mechanism mounted thereon, an upright support for said cutter-carrying arm, means comprising an electric motor carried by said arm for rotating the latter horizontally on said support, and means comprising an additional electric motor carried by said arm for operating said kerf cutting mechanism.

94. In a mining machine, the combination with a cutter-carrying arm, of kerf cutting mechanism mounted thereon, an upright anchoring jack for pivotally supporting said cutter-carrying arm intermediate the ends of said jack, means comprising an electric motor for continuously rotating said cutter-carrying arm horizontally about said jack, and means comprising an additional electric motor for operating said cutting mechanism.

95. In a mining machine, the combination with a cutter-carrying arm, of a support therefor, a cutter mounted on said arm, means comprising an electric motor for operating said cutter, means comprising an additional electric motor for feeding said arm about said support, and automatic means to effect a variation of speed of said feeding means to move the arm to initial cutting position more rapidly than during feeding movement while said cutter is cutting.

96. In a mining machine, the combination with a cutter-carrying arm, of a kerf cutter on said arm and operable relatively thereto, a second kerf cutter mounted on said arm to operate relatively thereto in a plane substantially at right angles to the plane of said first named kerf cutter and following the latter, means for operating said kerf cutters, and means for adjusting the distance of said second kerf cutter from said first named kerf cutter.

97. In a mining machine, the combination with a kerf cutter, of a motor connected thereto to drive the same, a frame, and means for yieldingly supporting said motor and said cutter on said frame.

98. In a mining machine, the combination with a kerf cutter, of a motor connected thereto, a frame for said motor and cutter, a support to which said frame is pivotally connected, and a spring between said support and said frame in position to take the weight of said frame together with said kerf cutter and motor.

99. In a mining machine, the combination with a main frame, of a supplemental frame supported for swinging movements on an upright axis on said main frame, an auxiliary frame connected to said supplemental frame, an upright kerf-cutter mounted at the other end of said auxiliary frame, a shaft connected directly to said kerf-cutter and adapted to occupy a radial position on said auxiliary frame relatively to the axis of swing of said supplemental frame, a holder mounted on said auxiliary frame and connected to said shaft for actuating said cutter, and means for adjusting the position of said auxiliary frame and holding the same in adjusted position where said shaft will be approximately radial relatively to said upright axis.

100. In a mining machine, the combination with a main frame, of a supplemental frame mounted to swing on an upright axis on said main frame, a horizontal kerf-cutter mounted for operation at the outer end of said supplemental frame, a bracket secured to said supplemental frame and extending back therefrom while being carried wholly thereby, an auxiliary frame mounted on said bracket and carried wholly thereby, an upright kerf-cutter at the outer end of said auxiliary frame, a driving shaft for said upright kerf cutter, means for supporting said shaft on said auxiliary frame at right angles to said upright kerf cutter and approximately radial relative to said upright axis, means for simultaneously actuating said kerf cutters, means for swinging said supplemental frame on said upright axis to effect the feeding of said kerf cutters through arcs of movement by the bodily movement of said supplemental frame, said bracket, and said auxiliary frame, as a whole, and means for moving said auxiliary frame relatively to said bracket to adjust the radial position of said shaft.

101. In a mining machine, the combination with a support, of a rotary carrier pivoted thereto, an auxiliary carrier pivoted to said rotary carrier, a spring on which said auxiliary carrier rests, a vertical rotary disk cutter on said auxiliary carrier, means for operating said cutter, and means for rotating said first named carrier.

102. In a mining machine, the combination with a rotary carrier, of a support, an auxiliary carrier pivoted to said rotary carrier, a disk cutter on said auxiliary carrier, an electric motor on said auxiliary carrier directly connected to said cutter, a yielding support for that portion of said auxiliary carrier supporting said disk cutter, and means for rotating said first named carrier on said support to secure feeding movement of said disk cutter.

103. In a mining machine, the combination with a post, of a rotary carrier pivoted to said post and movable along the same, a kerf-cutter directly on said carrier, an additional kerf-cutter also supported directly on said carrier to produce a kerf in a plane substantially at right angles to the plane of said first-named kerf-cutter, means for operating said kerf-cutters, means for rotating said carrier during the operation of said cutters to feed the latter while the relation between them on said carrier remains the same, and means for adjusting the relative position of said additional kerf cutter to adjust its radial axis relatively to said post.

104. In a mining machine, the combination with a post, of a plurality of main cutter carriers each individually pivoted to said post and each directly supported thereby, a plurality of spaced apart kerf cutters on said carriers, means for operating said cutters to produce a plurality of spaced apart kerfs in the mine wall, a plurality of auxiliary cutter carriers respectively supported by said main cutter carriers and traveling therewith back of the same partly through the kerfs produced by said spaced apart kerf cutters, vertical kerf cutters on said auxiliary carriers, means for operating said vertical cutters to produce vertical kerfs at the inner ends of the horizontal kerfs and spaced back from the mine wall, and means for rotating said main carriers to feed all of said cutters simultaneously.

105. In a mining machine, the combination with a support, of a carrier pivoted thereto, a device on said carrier movable in an arc therewith and adapted to enter a reentrant or branching kerf back from the mine wall to dislodge cut material therefrom, and means for rotating said carrier together with said dislodging device.

106. In a mining machine, the combination with a support, of a carrier, means for rotating said carrier, and a wedge on said carrier movable in an arc to enter an arc-shaped kerf in a mine wall back of a crescent-shaped mass of material.

107. In a mining machine, the combination with a rotary carrier, of means for supporting the same, a double wedge on said carrier to enter vertical kerfs above and below the horizontal kerf and back from the mine wall behind crescent-shaped masses of material to dislodge the same, and means to rotate said carrier together with said double wedge to move the latter through an arc.

108. In a mining machine, the combination with a support, of a rotary carrier, and a wedge pivoted to said carrier to adapt said wedge to enter an arc-shaped reëntrant kerf spaced back from the mine wall and dislodge material therefrom.

109. In a mining machine, the combination of a rotary carrier adapted to extend into a horizontal kerf in a mine wall to a vertical arcuate cylindrical kerf spaced back from the mine wall, and mechanism supported wholly by said carrier and dragged by said carrier into the vertical kerf back to the material to dislodge the same.

110. In a mining machine, the combination of mechanism for cutting a cylindrical arc-shaped kerf spaced back from the mine wall, and means extended into said kerf to dislodge material between said kerf and the face of the mine wall.

111. In a mining machine, the combination with kerf-cutting mechanism, of means for feeding said cutting mechanism in an arc, breaking down means following said cutting mechanism and entering a kerf spaced back from the mine wall, a main conveyer, and a supplemental conveyer in position to receive automatically material dislodged by said breaking down means and transferring the same to said main conveyer.

112. In a mining machine, the combination with a support, of cutting mechanism pivoted thereto, means for continuously rotating said cutting mechanism on said support, a main conveyer, a supplemental conveyer pivoted to said support, and means for effecting the lifting of the supplemental conveyer over said main conveyer and for effecting the moving of said supplemental conveyer into position to receive dislodged material and transfer the said main conveyer.

113. In a mining machine, the combination with cutting mechanism, of means for feeding the same over a complete circle, a main conveyer, a supplemental conveyer following said cutting mechanism in position to receive material dislodged by said cutting mechanism and also movable over a complete circle, and means for permitting a free movement of said supplemental conveyer over said main conveyer back into position for transferring dislodged material to said main conveyer.

114. In a mining machine, the combination with a support, of a plurality of kerf cutters mounted on said support, and means for simultaneously shifting the position of the uppermost and lowermost kerf cutters in opposite directions relatively to each other and each relatively to said support while maintaining them in parallelism.

115. In a mining machine, the combination with a support, of a frame mounted on said support, a kerf-cutter on said frame, means for operating said kerf-cutter including the feed thereof by movement of said frame on said support, and automatic mechanism for effecting the movement of said frame along said support during the feed of said kerf-cutter to automatically adjust the position of the latter to various planes parallel to each other.

116. In a mining machine, the combination with an individual roof kerf cutter, of an individual floor kerf cutter, means for operating said cutters, and means for adjusting the distance between cutters by moving them individually in opposite directions while maintaining them in parallelism.

117. In a mining machine, the combination with spaced apart individual kerf cutters, of means for operating said cutters, and means for varying the distances between said kerf cutters by moving one up and the other down independently of each other while maintaining them in parallelism.

118. In a mining machine, the combination with a roof kerf cutter, of a floor kerf cutter, means for operating said kerf cutters, means individual to each of said kerf cutters for varying the inclination thereof, and automatic mechanism for varying the distance of said kerf cutters over the idle period of movement thereof.

119. In a mining machine, the combination with kerf-cutting mechanism, of a support thereof, means for varying the elevation of said kerf-cutting mechanism, and means comprising an extensible driving connection direct to the center of said kerf-cutting mechanism for operating the latter.

120. In a mining machine, the combination with a plurality of spaced apart kerf cutters, of driving mechanism comprising a rotary grooved hub pivotally mounted, kerf-cutting mechanism mounted on said hub to be driven thereby, an additional kerf cutter, and flexible connections comprising a shaft with a head engaging said grooved hub.

121. In a mining machine, the combination with a support, of a plurality of cutter carriers individually pivoted to said support, a plurality of plane kerf cutters one mounted on each of said cutter carriers, driving connections located directly between said kerf cutters themselves, means for operating said kerf cutters simultaneously, and means for imparting a feeding movement to said cutter carrier during the operation of said kerf cutters, to cut a plurality of spaced apart plane kerfs in a mine wall.

122. In a mining machine, the combination with a plurality of spaced apart plane kerf cutters, of a support, a plurality of cutter carrying arms mounted for pivotal movement on said support and sliding movement along the same, means for effecting the automatic regulation of the distances between said arms along said support during the rotation of said arms by requiring said cutters to be each automatically moved along said support in closed paths respectively during their rotations about said support, and means for maintaining driving connections between said plane kerf cutters for the various positions of said arms.

123. In a mining machine, the combination with a support, of a plurality of plane kerf cutters, arms of carrying said kerf cutters spaced apart, automatic means for adjusting said arms along said support to vary the spacing between said kerf cutters when out of operation and maintain them in position while in operation, and means for operating said kerf cutters through connections extending directly from one kerf cutter to the next adjacent at a different elevation.

124. In a mining machine, the combination with a support, of a plurality of cutter carrying arms pivoted to said support, driving connections between said cutter carrying arms, means for imparting a feeding movement simultaneously to said cutter carrying arms, a plurality of plane kerf cutters, one mounted for operation on each of said cutter carrying arms, means for effecting the lowering of the uppermost cutter carrying arm and its kerf cutter and the elevation of the lowermost cutter carrying arm and its kerf cutter during a predetermined portion of travel of the cutter carrying arms, flexible driving connections between said kerf cutters, and means for operating all of said kerf cutters simultaneously.

125. A mining and loading machine comprising a single flat kerf cutter and means for operating the same to produce a horizontal kerf across a mine wall, a conveyer pivotally mounted to swing on an upright axis to follow said kerf cutter, and a pivotal connection permitting said conveyer to have an independent vertical movement relatively to said kerf cutter.

126. A mining and loading machine comprising a kerf cutter, means for operating the same, a pivotal connection rendering said kerf cutter capable of swinging vertically to various planes of adjustment, a conveyer capable of following said cutter to automatically load material dislodged by said kerf-cutter, and a pivotal connection for rendering said conveyer capable of swinging vertically.

127. A mining and loading machine comprising a kerf cutter, a cutter carrier pivoted on an upright axis, a conveyer pivotally connected to said cutter carrier to swing vertically on a horizontal axis, means for actuating said kerf cutter, and mechanism for rotating said cutter carrier on said upright axis and dragging along said conveyer by the pivoted connection between the same and said cutter carrier.

128. A mining and loading machine comprising a plurality of kerf cutters each mounted to swing vertically, a conveyer mounted to swing vertically, and means for operating said kerf cutters including the feed thereof while said conveyer is moved along back of said kerf cutters by the feed of the latter.

129. A mining and loading machine comprising a kerf cutter, a cutter carrier mounted to swing in an arc, a conveyer, and a pivotal connection between said carrier and said conveyer for causing said conveyer to be swung with said carrier in an arc and rendering said conveyer capable of pivotal movement relatively to said carrier.

130. A mining and loading machine comprising kerf cutting mechanism, a frame for carrying said kerf cutting mechanism to swing on an upright axis through an arc of 180° or more, a main conveyer having its rear end stationary as to lateral movement while said kerf cutting mechanism is making a cut, a supplemental swinging conveyer mounted to swing through an arc of 180° or more and being in communication with the forward end of said main conveyer throughout its swinging movement to deliver material to said main conveyer from any position of its swinging movement.

131. A mining and loading machine comprising kerf cutting mechanism, a main conveyer, a supplemental conveyer, means for operating said kerf cutting mechanism including the feed thereof from the position in central longitudinal alinement with said main conveyer to a position at right angles to said conveyer, and connections for swinging said supplemental conveyer through an equal arc of movement while in communication with said main conveyer to deliver dislodged material thereto throughout such range of movement.

132. A mining and loading machine comprising apparatus for dislodging a crescent-shaped mass of material from a mine wall, a main conveyer, a supplemental conveyer following said dislodging apparatus through an arc of 180° or more, and means for operating said supplemental conveyer to deliver dislodged material to said main conveyer throughout such range of movement of said supplemental conveyer.

133. A mining and loading machine comprising apparatus for dislodging gradually a crescent-shaped mass of material, a main conveyer, a supplemental conveyer in communication with the receiving end of said main conveyer, through an arc of movement of 180° or more, means for operating said dislodging apparatus including the arcuate feed thereof through 180° or more, mechanism for effecting movement of said supplemental conveyer back of said dislodging apparatus through an angle of 180° or more, and means for operating said supplemental conveyer to deliver material to said main conveyer as fast as it is dislodged.

134. A mining and loading machine comprising kerf cutting mechanism, a frame for supporting said kerf cutting mechanism for swinging feeding movement on an upright axis, a conveyer connected to said frame for movement therewith back of said kerf cutting mechanism throughout the range of arcuate movement of said kerf cutting mechanism of 180° or more, and an additional conveyer the rear end of which is swingable into position for delivering material into mine cars and the forward end of which is in communication with said first named conveyer throughout the operating range of movement of said kerf cutting mechanism.

135. A mining and loading machine comprising a plurality of spaced apart kerf cutters mounted to swing with a feeding movement in an arc, a conveyer mounted to swing with said cutters, means for adjusting the kerf cutters with respect to each other while maintaining them in parallelism during the period of idle movement, and means for adjusting the elevation of all of the cutters bodily.

136. In a mining machine, the combination with a support, of a rotary carrier, and a device pivoted for movement horizontally and pivoted for movement vertically to adapt said device to enter an upright kerf spaced back from the mine wall and dislodge material between the mine wall and such kerf.

137. In a mining and loading machine, the combination with apparatus for gradually dislodging a crescent-shaped mass of material from a mine wall, of a main conveyer, a supplemental conveyer operating back of said dislodging apparatus in the space occupied by the material dislodged immediately before the conveyer acts thereon, such supplemental conveyer being arranged to deliver material to said main conveyer through a range of more than 90°, and means for feeding the cutting apparatus in an arc and moving the supplemental conveyer therewith.

138. A mining and loading machine comprising supporting frame-work, kerf-cutting mechanism pivotally mounted thereon for arcuate feeding movement, means mounted on said frame-work in position to act on material at a mine wall for dislodging such material onto the floor of the mine, and mechanism pivotally mounted on said framework for moving arcuately across the mine wall in position for taking the dislodged material from the position assumed thereby on the floor of the mine and moving it toward loading position.

139. In a mining and loading machine, the combination with kerf-cutting mechanism, of pivoted means movable arcuately laterally across a mine wall for dislodging material from said mine wall onto the floor of the mine chamber, means for feeding said cutting mechanism arcuately, and loading apparatus comprising a pivoted portion following said dislodging mechanism arcuately laterally across the mine wall in position for taking the dislodged material off the floor and moving it toward loading position during the operation of said kerf-cutting mechanism.

140. In a mining and loading machine, the combination with pivoted apparatus for simultaneously dislodging a plurality of crescent-shaped masses of material from a mine wall, of means for operating said dislodging apparatus including the arcuate feed thereof on its pivot, and loading apparatus having a pivoted portion extending into position for arcuate movement to move dislodged material toward loading position immediately after being dislodged.

141. In a mining and loading machine, the combination with pivoted apparatus for dislodging superposed crescent-shaped masses of material, of means for operating said dislodging apparatus including the arcuate feed thereof on its pivot, and loading apparatus comprising a pivoted conveyer extending to the floor of the mine at the base of the mine wall for arcuate movement to take the dislodged material and moving it toward loading position, said conveyer being confined to such floor space for its operating position for all of the superposed masses of material aforesaid.

142. In a mining and loading machine, the combination with mechanism for dislodging a crescent shaped mass of material, of loading apparatus comprising a conveyer connected to said dislodging mechanism and being tiltable up and down independently thereof, and means for operating said loading apparatus to cause said conveyer to load material received thereby after being dislodged by said dislodging mechanism.

143. A mining and loading machine comprising apparatus for dislodging a crescent-shaped mass of material in one operation, means for operating the same including arcuate feed thereof, a main conveyer, and a supplemental conveyer communicating with said main conveyer throughout a range of approximately 180° for delivering dislodged material from the mine wall to said main conveyer during the operation of said dislodging apparatus.

144. A mining and loading machine comprising a main frame, a supplemental frame, a main conveyer mounted on said main frame, a supplemental conveyer connected to said supplemental frame, kerf cutting mechanism mounted on said supplemental frame, means for operating said kerf cutting mechanism including the feed thereof through an arc while dragging along said supplemental conveyer, said supplemental conveyer together with said cutting mechanism and said supplemental frame being foldable onto said main frame above said main conveyer, ceiling jacks for said main and supplemental frames, and means for elevating said main and supplemental frames together with all of the parts connected thereto to permit a transporting truck to be moved under said main and supplemental frames and the transportation thereof while folded as stated.

145. In a mining machine, the combination with a main frame, of a supplemental frame, a plurality of flat cutters mounted on said supplemental frame and fed therewith for cutting spaced apart kerfs in a mine wall, means for adjusting said cutters to effect the cutting of kerfs at the roof and at the floor of a mine chamber at varying inclinations relatively to said main frame, and means for operating said cutters.

146. In a mining and loading machine, the combination with a frame, of means mounted thereon for movement in an arc to dislodge a section of material from a mine wall and convey it therefrom in a single arcuate feeding operation of such means, said means comprising spaced apart kerf-cutters vertically adjustable with respect to each other, and conveyer mechanism mounted on said frame and extending into position for action on dislodged material in the space originally occupied thereby before dislodgment to convey such material back from the mine wall.

147. In a mining and loading machine, the combination with a frame, of spaced apart kerf-cutting mechanism mounted thereon and vertically adjustable with respect to each other, means for operating said kerf-cutting mechanism including arcuate feed thereof to cut a slab of material in a mine wall, additional kerf-cutting mechanism following said first-named kerf-cutting mechanism, means for operating said additional kerf-cutting mechanism to cut a kerf in an arc spaced back from the mine wall, breaking mechanism following said additional kerf-cutting mechanism to break down the material bounded by the kerfs produced by said kerf-cutting mechanisms, and a conveyer extending to the space originally occupied by the dislodged material and following said kerf-cutting mechanisms and said breaking mechanism to gradually convey the dislodged material back from the mine wall.

148. In a mining and loading machine, the combination with supporting frame-work comprising a forward upright standard, of dislodging apparatus mounted on said standard for operation in a mine wall in advance of said frame-work and for movement into folding position back of said standard when the mining and loading machine is to be transported, conveyer mechanism having one section movable with the dislodging mechanism and another section extending back from the forward end of said frame-work under the said dislodging mechanism when the latter is in folded position, and spaced-apart anchoring devices between which said dislodging mechanism partially lies when in folded position.

149. In a mining and loading machine, the combination with a frame, of spaced-apart cutter-carriers mounted on said frame at different elevations, flat kerf-cutters, one mounted on each of said cutter-carriers and angularly disposed to each other for cutting positions, means for operating said kerf-cutters including bodily movement of said cutter-carriers across a mine wall in a general horizontal direction, and loading apparatus having a receiving end following said kerf-cutters and extending into a position at the mine wall to receive the material dislodged by said kerf-cutters and convey such material toward loading position.

150. In a mining and loading machine, the combination with a main frame, of a supplemental frame mounted to swing on an upright axis on said main frame, of kerf-cutting mechanism mounted on said supplemental frame, and loading apparatus comprising conveyer mechanism extending from the position back of the kerf-cutting mechanism and along said main frame back of said upright axis to loading position, a portion of said conveyer mechanism being adapted to rest flat on the floor of the mine chamber.

151. In a machine for undercutting, breaking-down and loading coal, the combination of a frame movable in a curved path substantially parallel to a curved coal face, a low down laterally projecting horizontal kerf-cutter on the frame for undercutting the coal to be removed, means for engaging the frame and causing it to move in a fixed circular path, means behind the cutter for breaking down coal, and means for removing the broken down coal, said breaking-down and removing means performing their respective functions as the said cutter is advanced to form the kerf.

152. In a machine for undercutting, breaking-down and loading coal, the combination of a low down horizontal movable kerf-cutter for undercutting the coal to be removed, a coal receiving plate behind and movable with the cutter in the plane of the bottom of the kerf cut thereby, means for guiding the said cutter and the said plate in a fixed circular path, means behind the cutter for breaking coal down onto the said plate, and means for engaging coal on the said plate and removing it, said breaking-down and removing means performing their respective functions as the said cutter is advanced to form the kerf.

153. In a mining machine for undercutting, breaking-down and loading coal, the combination of a frame movable in a curved path substantially parallel to a curved coal face, a low down laterally projecting horizontal kerf cutter on the frame for undercutting the coal to be removed, means for moving the frame in a fixed circular path, means behind the cutter for breaking down coal, and an endless conveyer mounted on the frame for engaging the broken-down coal and removing it, said breaking-down means and said conveyer performing their respective functions as the said cutter is advanced to form a kerf.

154. A mining and loading machine comprising a supporting frame, mechanism mounted thereon in position for dislodging from a mine wall a crescent-shaped mass of material extending in a general horizontal direction, said dislodging mechanism comprising a plurality of plane kerf-cutters, and power mechanism mounted on said frame in proximity to said dislodging mechanism for taking the dislodged material mechanically from the position assumed thereby at the mine wall immediately after being dislodged and transferring such material away from the mine wall back toward loading position.

155. A mining and loading machine comprising means for dislodging a crescent-shaped mass of material from a mine wall, a chain flight-conveyer, a platform intermediate the mine wall and said chain flight-conveyer, and mechanism for moving the dislodged material from the mine wall onto said platform and over the same into the path of the flights of said conveyer.

156. A mining and loading machine comprising a supporting frame, means mounted on said frame for dislodging material from a mine wall, a loading conveyer mounted on said frame in fixed relation thereto, and apparatus comprising a vertical device mounted on said frame for moving the dislodged material onto said conveyer.

157. In a machine for undercutting, breaking down and loading coal, the combination with a supporting frame, of a supplemental frame mounted on said supporting frame for moving it in a curved path on an upright axis and substantially parallel to a curved coal face, a laterally projecting kerf cutter mounted on said supplemental frame to cut a kerf including a horizontal plane approximately at the floor of the mine chamber, means for operating said kerf cutting mechanism including the feed thereof by swinging said supplemental frame on said upright axis while said supporting frame remains stationary, means behind the cutter for breaking down the cut coal from the unmined mass, conveyer mechanism mounted on said supplemental frame and movable therewith in position relative to said kerf cutting mechanism to receive the dislodged coal and convey it toward loading position during the feed of said kerf cutting mechanism.

158. A machine for undercutting, breaking and loading coal comprising a frame movable in a curved path substantially parallel to a curved coal face, a low-down laterally projecting horizontal kerf-cutter on said frame in position for undercutting the coal to be removed, means acting on said frame to cause it to move in a fixed circular path, means in position behind the cutter for breaking the coal, and means extending under the cut coal for removing it from the coal face.

159. A machine for undercutting, breaking and loading coal comprising a low-down horizontal movable kerf-cutter for undercutting the coal to be removed, a coal-receiving plate behind and movable with the cutter in the plane of the kerf cut thereby, means for guiding said cutter and said plate in a fixed circular path, and means in position to break the coal after being cut.

160. A machine for undercutting, breaking and loading coal comprising a frame movable in a curved path substantially parallel to a curved coal face, a low-down laterally projecting horizontal kerf-cutter on the frame for undercutting the coal to be removed, means for moving the frame in a fixed circular path, means in position for breaking the coal after being cut, and a conveyer in position for receiving the dislodged coal on the upper surface thereof and carrying such coal toward loading position while resting on said conveyer freely by gravity.

161. A machine for undercutting, breaking and loading coal comprising a frame movable in a curved path substantially parallel to a curved coal face, a laterally projecting horizontal kerf-cutter on the frame in position for undercutting the coal to be removed, means for operating said kerf-cutter including the movement of said frame in a fixed circular path to secure feed of said kerf-cutter, means in position for breaking the coal after being cut, and a conveyer in position back of the kerf-cutter to receive dislodged material on the upper side thereof and transfer such dislodged material toward loading position.

In testimony whereof I have signed my name to this specification, in the presence of two subscribing witnesses, on this 26th day of April, A. D. 1913.

EDMUND C. MORGAN.

Witnesses:
CHARLES H. SEEM,
M. HARTY.

Copies of this patent may be obtained for five cents each, by addressing the "Commissioner of Patents, Washington, D. C."